(12) United States Patent
Veeningen

(10) Patent No.: US 11,362,829 B2
(45) Date of Patent: Jun. 14, 2022

(54) DISTRIBUTED PRIVACY-PRESERVING VERIFIABLE COMPUTATION

(71) Applicant: KONINKLIJKE PHILIPS N.V., Eindhoven (NL)

(72) Inventor: Meilof Geert Veeningen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 247 days.

(21) Appl. No.: 16/475,756

(22) PCT Filed: Dec. 28, 2017

(86) PCT No.: PCT/EP2017/084678
§ 371 (c)(1),
(2) Date: Jul. 3, 2019

(87) PCT Pub. No.: WO2018/127446
PCT Pub. Date: Jul. 12, 2018

(65) Prior Publication Data
US 2019/0372768 A1 Dec. 5, 2019

Related U.S. Application Data

(60) Provisional application No. 62/608,696, filed on Dec. 21, 2017, provisional application No. 62/443,162, filed on Jan. 6, 2017.

(51) Int. Cl.
*H04L 9/32* (2006.01)
*H04L 9/08* (2006.01)
*H04L 9/14* (2006.01)

(52) U.S. Cl.
CPC ............ *H04L 9/3218* (2013.01); *H04L 9/085* (2013.01); *H04L 9/14* (2013.01); *H04L 2209/46* (2013.01)

(58) Field of Classification Search
CPC ....... H04L 9/085; H04L 9/14; H04L 2209/46; H04L 9/3218
See application file for complete search history.

(56) References Cited

U.S. PATENT DOCUMENTS 8,731,199 B2 * 5/2014 Jawurek ................ H04L 9/3221
380/268
9,077,539 B2 * 7/2015 Kamara ................ H04L 9/3218
(Continued)

FOREIGN PATENT DOCUMENTS

CN 105491006 A 4/2016
WO 2016155804 A1 10/2016

OTHER PUBLICATIONS

Schoenmakers, et al. "Trinocchio: Privacy-Friendly Outsourcing by Distributed Verifiable Computation." IACR Cryptol. ePrint Arch. 2015 (Year: 2015).*
(Continued)

*Primary Examiner* — Jeremy S Duffield
*Assistant Examiner* — Zhe Liu

(57) ABSTRACT

According to an aspect, there is provided a first node for use in a system, wherein the first node is configured to determine a plurality of keys for enabling a computation by a plurality of worker nodes in the system, wherein the computation comprises a plurality of computation parts, wherein the plurality of computation parts comprises one or more types of computation part, and wherein an output from one computation part to another computation part is a shared block; and publish the determined plurality of keys for access by at least one input node in the system, the plurality of worker nodes, and at least one recipient node in the system; wherein the plurality of keys comprises a computation part prove key for each part of the computation; a computation part verification key for each part of the computation; a shared block commitment generation key for each shared block; an input (Continued)

commitment generation key for each input node and computation part combination; and an output commitment generation key for each recipient node and computation part combination. A corresponding method of operating a first node is also provided.

16 Claims, 9 Drawing Sheets

(56) References Cited

U.S. PATENT DOCUMENTS

| | | | |
|---|---|---|---|
| 9,191,196 B2* | 11/2015 | Raykova | H04L 9/008 |
| 9,449,177 B1 | 9/2016 | El Defrawy et al. | |
| 9,742,739 B2* | 8/2017 | Dolev | H04L 65/403 |
| 10,083,310 B1* | 9/2018 | Lampkins | G06F 21/606 |
| 2012/0002811 A1 | 1/2012 | Smart | |
| 2013/0254255 A1* | 9/2013 | Nilsson | G06F 9/4881 709/201 |
| 2015/0016604 A1 | 1/2015 | Bellare et al. | |
| 2015/0341326 A1 | 11/2015 | Premnath et al. | |
| 2017/0149796 A1* | 5/2017 | Gvili | H04L 9/0625 |

OTHER PUBLICATIONS

Bitansky, Nir, et al. "Recursive composition and bootstrapping for SNARKs and proof-carrying data." Proceedings of the forty-fifth annual ACM symposium on Theory of computing. 2013 (Year: 2013).*

Damgård, Ivan, et al. "Asynchronous multiparty computation: Theory and implementation." International workshop on public key cryptography. Springer, Berlin, Heidelberg, 2009. (Year: 2009).*

Schuster, Felix, et al. "VC3: Trustworthy data analytics in the cloud using SGX." 2015 IEEE Symposium on Security and Privacy. IEEE, 2015. (Year: 2015).*

Boyle et al.,"Large-Scale Secure Computation." IACR Cryptology ePrint Archive. Mar. 2014. (Year: 2014).*

Volgushev et al., "Programming Support for an Integrated Multi-Party Computation and MapReduce Infrastructure." 2015 Third IEEE Workshop on Hot Topics in Web Systems and Technologies. Nov. 2015. p. 60-66. (Year: 2015).*

International Search Report and Written Opinion for International Application No. PCT/EP2017/084678, filed Dec. 28, 2017, 19 pages.

Schoenmakers, et al., "Trinocchio: Privacy-Friendly Outsourcing by Distributed Verifiable Computation", International Association for Cryptologic Research, vol. 20160707, Jul. 7, 2016, pp. 1-33.

Costello, et al., "Geppetto: Versatile Verifiable Computation", 2015 IEEE Symposium on Security and Privacy, May 1, 2015, pp. 253-270.

Lipmaa, H., "Prover-Efficient Commit-And-Prove Zero-Knowledge SNARKs", from book Progress in Cryptology—AFRICACRYPT 2016, 8th International Conference on Cryptology in Africa, Mes, Morocco, Apr. 13-15, 2016, Proceedings, pp. 185-206.

Veeningen, M., "Geppettri: Distributed Privacy-Preserving Verifiable Computation", IEEE Symposiun on Security and Privacy, Date of Conference May 17-21, 2015, 10 pages.

Ben-Sasson, et al., "Succinct Non-Interactive Arguments for a von Neumann Architecture", IACR Cryptology ePrint Archive, 2013:879, 2013.

Kosba, A., "TrueSet: Faster Verifiable Set Computations", Paper included in the Proceedings of the 23rd USENIX Security Symposium, Aug. 20-22, 2014, San Diego, CA, pp. 765-780.

Virza, M., "SNARKs for C: Verifying Program Executions Succintly and in Zero Knowledge", B.Sc., University of Latvia 2011, Submitted to the Dept. of Electrical Engineering and Computer Science for the Degree of Master of Science in Computer Science and Engineering at the Massachusetts Institute of Technology, 72 pages.

Hoogh, et al., "Certificate Validation in Secure Computation and Its Use in Verifiable Linear Programming", International Conference on Cryptology in Africa, AFICACRYPT 2016, Apr. 7, 2016, pp. 265-284.

Gennaro, et al., "Non-Interactive Verifiable Computing: Outsourcing Computation on Untrusted Workers", Feb. 1, 2010, Proceedings of the 30th Annual Conference on Advances in Cryptology, Aug. 15-19, 2010, pp. 465-482.

Bouti, et al., "Securing Cloud-based Computations against malicious providers", Published in Operating Systems Review 2012, vol. 46, Issue 2, Jul. 2012, pp. 38-42.

Cuvelier, et al., "Verifiable Multi-Party Computation with Perfectly Private Audit Trail", Applied Cryptography and Network Security 14th International Conference, ACNS 2016, Jun. 19-22, 2016, vol. 9696, No. 1, pp. 367-385.

* cited by examiner

DISTRIBUTED PRIVACY-PRESERVING VERIFIABLE COMPUTATION

CROSS-REFERENCE TO RELATED APPLICATIONS

The present application is the U.S. National Phase application under 35 U.S.C. § 371 of International Application No. PCT/EP2017/084678, filed on Dec. 28, 2017, which claims priority to and benefit of U.S. Provisional Application No. 62/443,162, filed Jan. 6, 2017, and U.S. Provisional Application No. 62/608,696, filed Dec. 21, 2017, their entirety of which are hereby incorporated by reference herein.

TECHNICAL FIELD

The techniques described herein relate to computations on input data, and in particular to computations that can be performed on input data in a distributed, privacy-preserving and verifiable manner.

BACKGROUND

Existing systems for outsourcing a computation to workers in the cloud can be divided among the following three axes:
  Distributed: If the function to be computed as part of the computation consists of multiple parts that can be easily decoupled (i.e. they can be computed independently without much overlap in data), does the system enable the computing of these different parts independently from each other by different (committees of) workers?
  Privacy-Preserving: Can the function be computed without the need for workers to learn the sensitive data that they are computing on?
  Verifiable: Does the recipient of the computation result receive a cryptographic proof that the computation was correct (that is valid even if all workers try to disrupt the computation)? Is this auditable, i.e. can producing this proof be optional and performed after the computation, with little overhead during the computation itself?

Table 1 below shows selected existing systems/algorithms and their compliance with the above three criteria.

TABLE 1

Selected Systems in Outsourcing Computation

| System | Distributed? | Verifiable? | Privacy? |
| --- | --- | --- | --- |
| Multiparty Computation | no | No | yes |
| Pinocchio | no | Yes | no |
| Gepetto | yes | Yes | no |
| Trinocchio | no | Yes | yes |

Multiparty computation (MPC) refers to typical MPC algorithms, Pinocchio is as described in "Pinocchio: Nearly Practical Verifiable Computation" by B. Parno, J. Howell, C. Gentry, and M. Raykova, in Security and Privacy, 2013 IEEE Symposium on, pages 238-252, 2013, Gepetto is as described in "Geppetto: Versatile verifiable computation" by Craig Costello, Cedric Fournet, Jon Howell, Markulf Kohlweiss, Benjamin Kreuter, Michael Naehrig, Bryan Parno, and Samee Zahur, in 2015 IEEE Symposium on Security and Privacy, S P 2015, San Jose, Calif., USA, May 17-21, 2015, pages 253-270, 2015, and Trinocchio is as described in "Trinocchio: Privacy-Friendly Outsourcing by Distributed Verifiable Computation" by Berry Schoenmakers, Meilof Veeningen, and Niels de Vreede, in Cryptology ePrint Archive, Report 2015/480, 2015.

Traditional multiparty computation (MPC) allows the performance of a computation in a committee of multiple workers in such a way that no individual worker learns the sensitive data in the computation. Although multiple workers are involved, it is not distributed in the sense that the workers all participate to compute the same function, as opposed to computing different parts of the computation independently.

An appealing feature of some systems, is when it is "auditable", meaning that the privacy-preserving computation can be separate in time from the production of the correctness proof. In other words, the computation can take place at one point in time, with little additional overhead relating to the proof; and only if needed later, the (computationally much heavier) task of producing a correctness proof can be undertaken. In some cases, producing the proof can even be done without any interaction between the workers.

SUMMARY

It would be beneficial to provide a system that allows the performance of a distributed privacy-preserving computation that has correctness guarantees. Moreover, performing privacy-preserving computations usually incurs a large performance overhead, particularly when also combined with correctness. Hence, it is important to enable distribution in order to reduce the computational burden on single devices and bring latency down.

Various embodiments disclosed herein present a system, methods and nodes that achieve, for the first time, verifiable, privacy-preserving and distributed computations. This allows the performance gains of distributed computing to be leveraged in settings where verifiability and privacy are useful.

According to a first specific aspect, there is provided a first node for use in a system, wherein the first node is configured to determine a plurality of keys for enabling a computation by a plurality of worker nodes in the system, wherein the computation comprises a plurality of computation parts, wherein the plurality of computation parts comprises one or more types of computation part, and wherein an output from one computation part to another computation part is a shared block; and publish the determined plurality of keys for access by at least one input node in the system, the plurality of worker nodes, and at least one recipient node in the system; wherein the plurality of keys comprises a computation part prove key for each part of the computation; a computation part verification key for each part of the computation; a shared block commitment generation key for each shared block; an input commitment generation key for each input node and computation part combination; and an output commitment generation key for each recipient node and computation part combination.

According to a second aspect, there is provided a method of operating a first node in a system, the method comprising determining a plurality of keys for enabling a computation by a plurality of worker nodes in the system, the computation comprising a plurality of computation parts, wherein the plurality of computation parts comprises one or more types of computation part, and wherein an output from one computation part to another computation part is a shared block;

and publishing the determined plurality of keys for access by at least one input node in the system, the plurality of worker nodes, and at least one recipient node in the system; wherein the plurality of keys comprises a computation part prove key for each part of the computation; a computation part verification key for each part of the computation; a shared block commitment generation key for each shared block; an input commitment generation key for each input node and computation part combination; and an output commitment generation key for each recipient node and computation part combination.

According to a third aspect, there is provided an input node for use in a system, wherein the input node has one or more inputs for a computation and the computation comprises a plurality of parts, wherein the input node is configured to obtain one or more input commitment generation keys for the input node, wherein the input commitment scheme used to generate the input commitment generation keys supports reuse of input commitments in multiple computation parts; determine, using the obtained one or more input commitment generation keys, an input commitment and an input commitment opening for each of the one or more inputs; output the one or more determined input commitments; and send, to each worker node in the system that is to perform a computation part on an input, a respective secret share of the determined input commitment opening for that input.

According to a fourth aspect, there is provided a method of operating an input node in a system, wherein the input node has one or more inputs for a computation and the computation comprises a plurality of parts, wherein the method comprises obtaining one or more input commitment generation keys for the input node, wherein the input commitment scheme used to generate the input commitment generation keys supports reuse of input commitments in multiple computation parts; determining, using the obtained one or more input commitment generation keys, an input commitment and an input commitment opening for each of the one or more inputs; outputting the one or more determined input commitments; and sending, to each worker node in the system that is to perform a computation part on an input, a respective secret share of the determined input commitment opening for that input.

According to a fifth aspect, there is provided a worker node for use in a system, wherein the worker node is configured to receive, from one or more other nodes in the system, a respective secret share of one or more input commitment openings for one or more inputs to a computation part of a computation to be performed by the worker node; obtain one or more output commitment generation keys; obtain a computation part prove key for the computation part to be performed by the worker node; wherein the computation part proving scheme used to generate the computation part prove key supports reuse of commitments in multiple computation part proofs of different types of computation; compute the result of the computation part using the received respective secret share of the one or more input commitment openings, wherein the result of the computation part is computed as a privacy-preserving computation by the worker node and the one or more other worker nodes, wherein the worker node and the one or more other worker nodes form a first committee of worker nodes; determine, using the obtained one or more output commitment generation keys, an output commitment and a secret share of an output commitment and a secret share of an output commitment opening for the result of the computation part; generate, using the computation part prove key, a computation part proof or a secret share of a computation part proof for use in proving that the worker node performed the computation part correctly with respect to the one or more input commitment openings and the determined output commitment openings; and output the computation part proof or the secret share of the computation part proof.

According to a sixth aspect, there is provided a method of operating a worker node in a system, wherein the method comprises receiving, from one or more other nodes in the system, a respective secret share of one or more input commitment openings for one or more inputs to a computation part of a computation to be performed by the worker node; obtaining one or more output commitment generation keys; obtaining a computation part prove key for the computation part to be performed by the worker node; wherein the computation part proving scheme used to generate the computation part prove key supports reuse of commitments in multiple computation part proofs of different types of computation; computing the result of the computation part using the received respective secret share of the one or more input commitment openings, wherein the result of the computation part is computed as a privacy-preserving computation by the worker node and the one or more other worker nodes, wherein the worker node and the one or more other worker nodes form a first committee of worker nodes; determining, using the obtained one or more output commitment generation keys, an output commitment or a secret share of an output commitment and a secret share of an output commitment opening for the result of the computation part; generating, using the computation part prove key, a computation part proof or a secret share of a computation part proof for use in proving that the worker node performed the computation part correctly with respect to the one or more input commitment openings and the determined output commitment openings; and outputting the computation part proof or the secret share of the computation part proof.

According to a seventh aspect, there is provided a recipient node for use in a system, wherein the recipient node is configured to receive, from one or more worker nodes in the system, secret shares of one or more output commitment openings for outputs of one or more computation parts of a computation performed by the one or more worker nodes, wherein an output from one computation part to another computation part is a shared block; obtain one or more published input commitments for one or more inputs to the computation provided by one or more input nodes in the system; obtain one or more shared block commitments for one or more shared blocks provided from a first committee of worker nodes to a second committee of worker nodes; form an output of the computation from the received secret shares of the one or more output commitment openings; obtain a computation part proof or secret shares of a computation part proof for each part of the computation; obtain a computation part verification key for each part of the computation; and use the computation part proof or secret shares of the computation part proof for each part of the computation and the one or more computation part verification keys to verify that the worker nodes in each committee performed the respective computation part correctly with respect to the one or more input commitments, the one or more shared block commitments and the output commitment openings or the output commitments.

According to an eighth aspect, there is provided a method of operating a recipient node in a system, wherein the method comprises receiving, from one or more worker nodes in the system, secret shares of one or more output commitment openings for outputs of one or more computation parts of a computation performed by the one or more worker nodes, wherein an output from one computation part to another computation part is a shared block; obtaining one or more published input commitments for one or more inputs to the computation provided by one or more input nodes in the system; obtaining one or more shared block commitments for one or more shared blocks provided from a first committee of worker nodes to a second committee of worker nodes; forming an output of the computation from the received secret shares of the one or more output commitment openings; obtaining a computation part proof or secret shares of a computation part proof for each part of the computation; obtaining a computation part verification key for each part of the computation; and using the computation part proof or secret shares of the computation part proof for each part of the computation and the one or more computation part verification keys to verify that the worker nodes in each committee performed the respective computation part correctly with respect to the one or more input commitments, the one or more shared block commitments and the output commitment openings or the output commitments.

According to a ninth aspect, there is provided a computer program product comprising a computer readable medium having computer readable code embodied therein, the computer readable code being configured such that, on execution by a suitable computer or processor, the computer or processor is caused to perform the method according to the second, fourth, sixth or eighth aspects.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Figure 1:
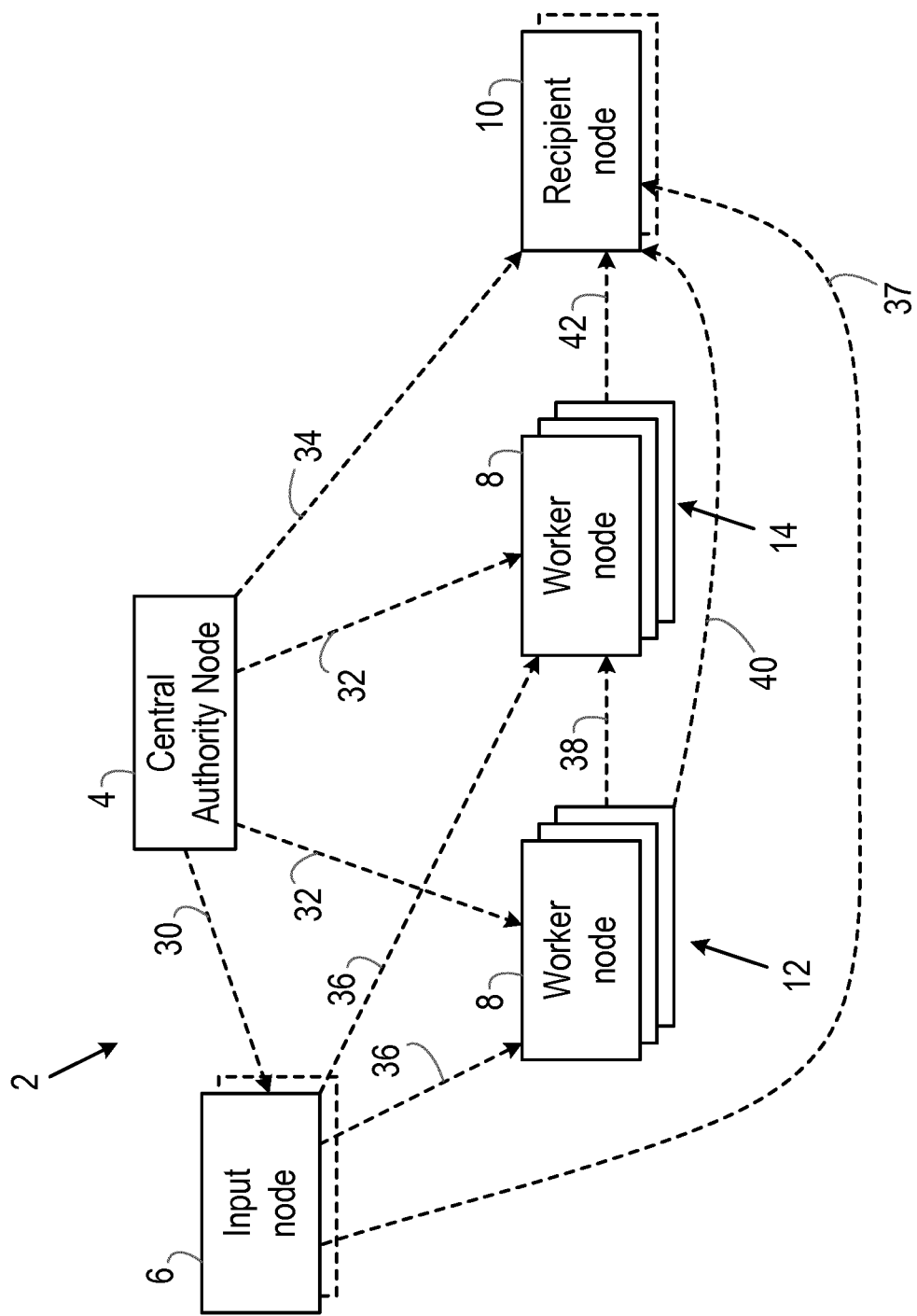
FIG. 1 is an illustration of a system implementing the techniques described herein.

FIG. 1 is a block diagram of a system 2 in which the techniques and principles described herein may be implemented. The system 2 comprises a first node 4 (which is also referred to herein as a central authority or central authority node 4), one or more input nodes 6 (which is also referred to herein as an 'inputter'), a plurality of worker nodes 8 and one or more recipient nodes 10 (which is also referred to herein as a 'verifier node').

Broadly, the system 2, particularly the central authority node 4 and the plurality of worker nodes 8, are provided to perform a computation on one or more items of input data provided by one or more of the input nodes 6. The output of the computation is provided to the one or more recipient nodes 10. A verifier node (which may be the recipient node 10 or a different recipient node 10) can confirm that the output of the computation is correct.

In some embodiments, the recipient node 10 may request that the computation is performed on private data owned or stored by one or more input nodes 6, and the input node(s) 6 can provide the private data as an input to the computation without the worker nodes 8 or recipient node 10 learning the content of the data.

In some embodiments, the recipient node 10 may request that the computation is performed on data owned or stored by the recipient node 10, in which case a particular recipient node 10 can operate both as an input node 6 and a recipient node 10 with respect to the computation. In these embodiments, input data may also be provided by one or more other input nodes 6.

In the techniques described herein, the computation comprises two or more computation parts that can be computed separately from each other by the worker nodes 8. The computation parts may be sequential (i.e. one computation part makes use of the output of the previous computation part), parallel (i.e. each computation part makes use of the input data to compute their own output), or any combination (e.g. a computation part could take an output of the previous computation part and the input data as inputs). In cases where a computation part provides its output as an input to another computation part, this output is referred to as a 'shared block'.

Each computation part is computed in a privacy-preserving manner by a respective group of worker nodes 8 (referred to as a 'committee'). FIG. 1 shows two committees of worker nodes 8, a first committee 12 comprising two or more worker nodes 8 that is for computing a first computation part and a second committee 14 comprising two or more worker nodes 8 that is for computing a second computation part. In some embodiments, a worker node 8 may be part of just one committee 12, 14, or a worker node 8 may be part of two or more committees 12, 14.

The plurality of computation parts that make up the computation can comprise computation parts that each relate to a different function, operation or calculation, or two or more of the computation parts can be of the same type (i.e. they relate to the same function, operation or calculation). For example, a computation could require the evaluation of $f(f(x))$, where x is the input data and $f$ is a function to be computed by a computation part. Here, both computation parts are of the same type (i.e. function $f$). In another example a computation could require the evaluation of $g(f(x))$, where x is the input data and $f$ and g are different functions to be computed by respective computation parts. Here, the computation parts are of different types (i.e. function f and function g).

Each of the nodes 4, 6, 8, 10 are interconnected to enable data and information exchange therebetween, for example via a network, such as the Internet, although one or more of any of the nodes 4, 6, 8, 10 may be co-located or otherwise interconnected via a local area network.

Each of the nodes 4, 6, 8, 10 can be in the form of any type of computing device or electronic device, such as a computer, a server, a laptop, a tablet, a smartphone, etc.

Figure 2:
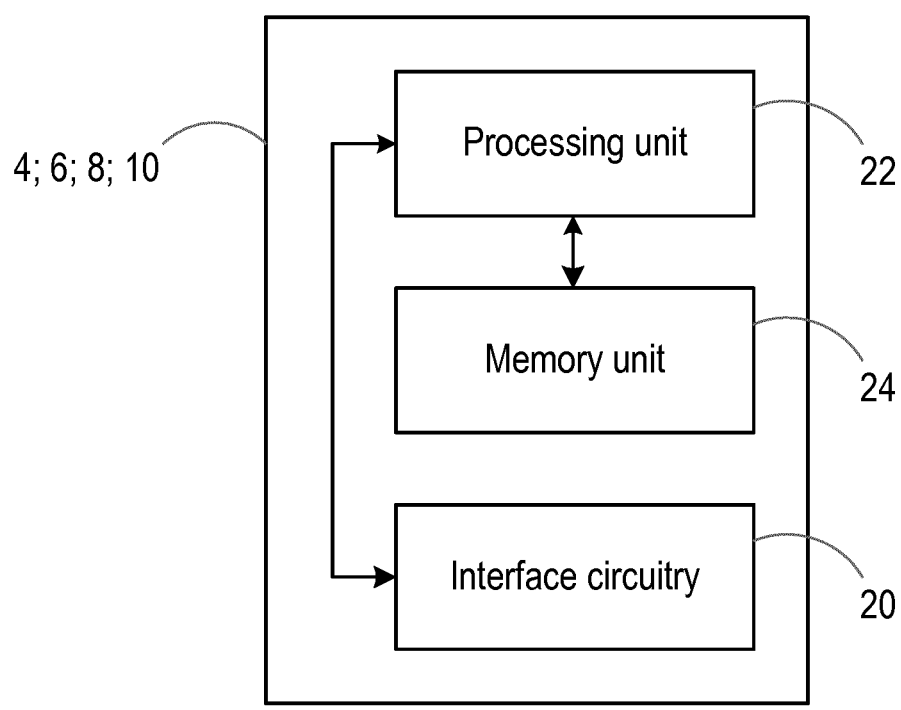
FIG. 2 is a block diagram of a node according to various embodiments.

FIG. 2 is a block diagram illustrating the components of a node according to various embodiments of the techniques described herein. Any of the central authority node 4, the input node(s) 6, the worker node(s) 8 and the recipient node(s) 10 can be implemented as shown in FIG. 2

According to FIG. 2, the node includes interface circuitry 20 for enabling a data connection to and/or data exchange with other nodes, such as other nodes in the system 2. In particular the interface circuitry 20 can enable a connection between the node 4, 6, 8, 10 and a network, such as the Internet, via any desirable wired or wireless communication protocol. For example, the interface circuitry 20 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.).

The node further includes a processing unit 22 for performing operations on data and for generally controlling the operation of the node. The interface circuitry 20 may be connected to the processing unit 22. The node further includes a memory unit 24 for storing any data required for the execution of the techniques described herein and for storing computer program code for causing the processing unit 22 to perform method steps as described in more detail below and as appropriate for the role that the node 4; 6; 8; 10 has in the system 2. The memory unit 24 may be connected to the processing unit 22.

The processing unit 22 can be implemented in numerous ways, with software and/or hardware, to perform the various functions described herein. The processing unit 22 may comprise one or more microprocessors or digital signal processor (DSPs) that may be programmed using software or computer program code to perform the required functions and/or to control components of the processing unit 22 to effect the required functions. The processing unit 22 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 24 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

It will be appreciated that a practical implementation of any of the central authority node 4, input node 6, worker node 8 and recipient node 10 may include additional components to those shown in FIG. 2. For example the node can include a power supply, such as a battery, or components for enabling the node to be connected to a mains power supply. As another example, the node can comprise a user interface that includes one or more components that enables a user of the node to input information, data and/or commands into the node (as appropriate), and/or enables the node to output information or data to the user of the node. The user interface can comprise any suitable input component(s), including but not limited to a keyboard, keypad, one or more buttons, switches or dials, a mouse, a track pad, a touchscreen, a stylus, a camera, a microphone, etc., and the user interface can comprise any suitable output component(s), including but not limited to a display screen, one or more lights or light elements, one or more loudspeakers, a vibrating element, etc.

According to some aspects of the techniques presented herein, verifiable computations can be made distributed. According to other aspects of the techniques presented herein, verifiable computations, can be made privacy-preserving (while also supporting multiple, mutually distrusting inputters and recipients).

FIGS. 3-6 are flow charts that illustrate exemplary methods of operating a central authority node 4, input node 6, worker node 8 and recipient node 10 respectively to provide a verifiable, distributed and privacy-preserving computation according to the techniques presented herein.

Figure 3:
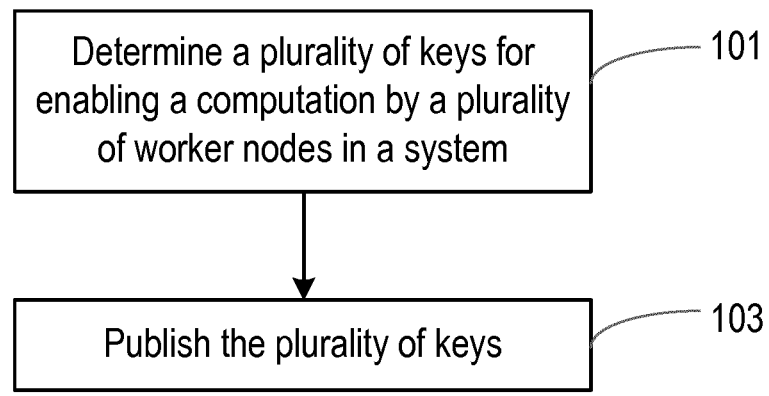
FIG. 3 is a flow chart illustrating exemplary operations of a central authority node according to various embodiments.

Thus, FIG. 3 is a flow chart that illustrates the steps in the method or steps in the operation of the central authority node 4. The steps can be performed by the processing unit 22 and/or the interface circuitry 20 as appropriate. In some embodiments, the processing unit 22 can perform the steps as a result of executing suitable program code stored in the memory unit 24.

In general, the central authority node 4 is responsible for setting up the computation system to enable the distributed, privacy-preserving and verifiable computation.

Thus, in step 101, the central authority node 4 determines a plurality of keys for enabling a computation by the plurality of worker nodes 8 in the system 2. The plurality of keys also enables an input node 6 to provide a privacy-preserving representation to an input that subsequent proofs can refer to, and enables a recipient node 10 to verify that the output of the computation is correct given the privacy preserving representation(s) to the input(s) and that the computation was performed correctly.

In step 103, the central authority node 4 publishes the determined plurality of keys. Thus the central authority node 4 makes the plurality of keys available for any node 6, 8, 10 in the system 2 to access. Publishing the keys can mean storing them in a location that is accessible by the other nodes 6, 8, 10, for example in memory unit 24 if that is accessible by the other nodes 6, 8, 10, or storing them on a server or other computer that is accessible via the Internet or other network.

As described in more detail below with reference to the methods shown in FIGS. 4-6, the input node(s) 6, worker node(s) 8 and recipient node(s) 10 obtain one or more of these published keys as required for their operation as part of the distributed, privacy-preserving and verifiable computation. The transfer of these (or the relevant) key(s) to the input node(s) 6 from the central authority node 4 is illustrated by signal 30, the transfer of these (or the relevant) key(s) to the worker node(s) 8 from the central authority node 4 is illustrated by signal 32, and the transfer of these (or the relevant) key(s) to the recipient node(s) 10 from the central authority node 4 is illustrated by signal 34. In each case, it will be appreciated that in practice the key(s) may not directly pass from the central authority node 4 to the relevant destination node(s) 6, 8, 10, but they may be obtained by those node(s) 6, 8, 10 from an intermediate storage node, depending on the way in which the central authority node 4 publishes the key(s).

The plurality of keys includes several different types of key.

The plurality of keys can include a computation part prove key for each part of the computation, and a computation part verification key for each part of the computation. The computation part prove key is to be used by a worker node 8 to generate a proof that a computation part performed by the worker node 8 was computed correctly. The computation part verification key can be used by a recipient node 10 along with the proof generated by the worker nodes 8 to verify that the computation part was performed correctly.

In some embodiments, each type of computation part has a respective computation part prove key and a respective computation part verification key (i.e. the computation part prove key and computation part verification key are different for each type of computation part). Thus, different computation parts that are of the same type (e.g. they both apply a function $f$) can have the same computation part prove key and computation part verification key.

In some embodiments, the computation part proving scheme that the central authority node 4 uses to generate the computation part prove key supports reuse or sharing of commitments (a private state) in multiple computation part proofs of different types of computation. Those skilled in the art will be aware of various computation part proving schemes that satisfy this property, including, for example, the schemes described in "Geppetto: Versatile verifiable computation" and "Prover-efficient commit-and-prove zero-knowledge snarks" by Helger Lipmaa, in Cryptology ePrint Archive, Report 2014/396, 2014. Further details are not otherwise provided in this part of the description.

The plurality of keys can also include one or more commitment generation keys. In some embodiments, the plurality of keys can also include one or more corresponding commitment verification keys. The commitment generation keys are used to generate commitments for a data element, and commitment openings for the data element. As is known, a commitment is a secret statement by a party as to the value of a data element (e.g. an input, a shared block, an output), and the commitment opening is the value that was originally committed to and information that enables a party that receives the commitment and commitment opening to verify that the value of the data element is correct (i.e. it corresponds to the value that was originally committed to). It will be appreciated that in some embodiments of the present disclosure, a data element (input/shared block/output) can be a vector.

The commitment generation keys can be divided into commitment generation keys (which are also referred to herein as 'commitment evaluation keys') for inputs (i.e. data elements) from input node(s) 6, commitment generation keys for shared blocks that are output from one computation part and input into another computation part, and commitment generation keys for output(s) from the computation to a recipient node 10. Likewise for the commitment verification keys.

For the purposes of the discussion of the techniques described herein, the central authority node 4 can be considered to determine a shared block commitment generation key for each shared block in the computation, a shared block commitment verification key for each shared block, an input commitment generation key for each computation part that an input node 6 is to provide an input to, a corresponding input commitment verification key for each input commitment generation key, an output commitment generation key for each computation part that a recipient node 10 is to receive an output from, and a corresponding output commitment verification key for each output commitment generation key.

In some embodiments, the input commitment scheme used to generate the input commitment generation keys supports reuse of input commitments in multiple computation parts. That is, input commitments generated by an input node 6 using the input commitment generation keys are not dependent on the computation part that the input is to be provided to. Those skilled in the art will be aware of various commitment schemes that satisfy this property, including, for example, "Prover-efficient commit-and-prove zero-knowledge snarks", and "ADSNARK: Nearly Practical and Privacy-Preserving Proofs on Authenticated Data" by Michael Backes, Manuel Barbosa, Dario Fiore and Raphael M. Reischuk in Cryptology ePrint Archive: Report 2014/617. Further details are not otherwise provided in this part of the description.

In some embodiments, the output commitment scheme used to generate the output commitment generation keys supports reuse of output commitments in multiple computation parts. That is, output commitments generated by a worker node 8 using the output commitment generation keys are not dependent on the computation part that the output (i.e. shared block) is output from. Those skilled in the art will be aware of various commitment schemes that satisfy this property, including, for example, "Prover-efficient commit-and-prove zero-knowledge snarks". Further details are not provided in this part of the description.

In some embodiments, the commitment generation keys can be the same for each type of node 6, 8, 10, and the commitment verification keys can be the same for each type of node 6, 8, 10. In other embodiments, the commitment generation keys and the corresponding commitment verification keys can be different for each type of node 6, 8, 10. In other embodiments, the commitment generation keys and the corresponding commitment verification keys can be different for each node 6, 8, 10 in the system (i.e. different for each of the worker nodes 8, etc.). In yet other embodiments, for each input node 6, there can be a respective commitment generation key (and corresponding commitment verification key) for each computation part that the input node 6 is to provide an input to in the computation.

In some embodiments, the computation requires or include one or more public parameters (i.e. parameters that are not private). Examples of public parameters include a minimally desired accuracy for an estimator, or a maximum number of spelling mistakes for an exact search query. In these embodiments, the central authority node 4 can determine the values of these public parameters, and publish them for access by any of the nodes 6, 8, 10 in the system 2.

In some embodiments, the recipient node(s) 10 may determine or provide values of one or more parameter values (e.g. constants) that are used in the computation, in which case there is a different computation part verification key for each type of computation part. In other embodiments, the recipient node(s) 10 does not provide the values (e.g. because the input node(s) 6 determine or provide the values of one or more parameter values, or there are no public parameters), in which case the computation part verification key can be the same for each type of computation part.

Figure 4:
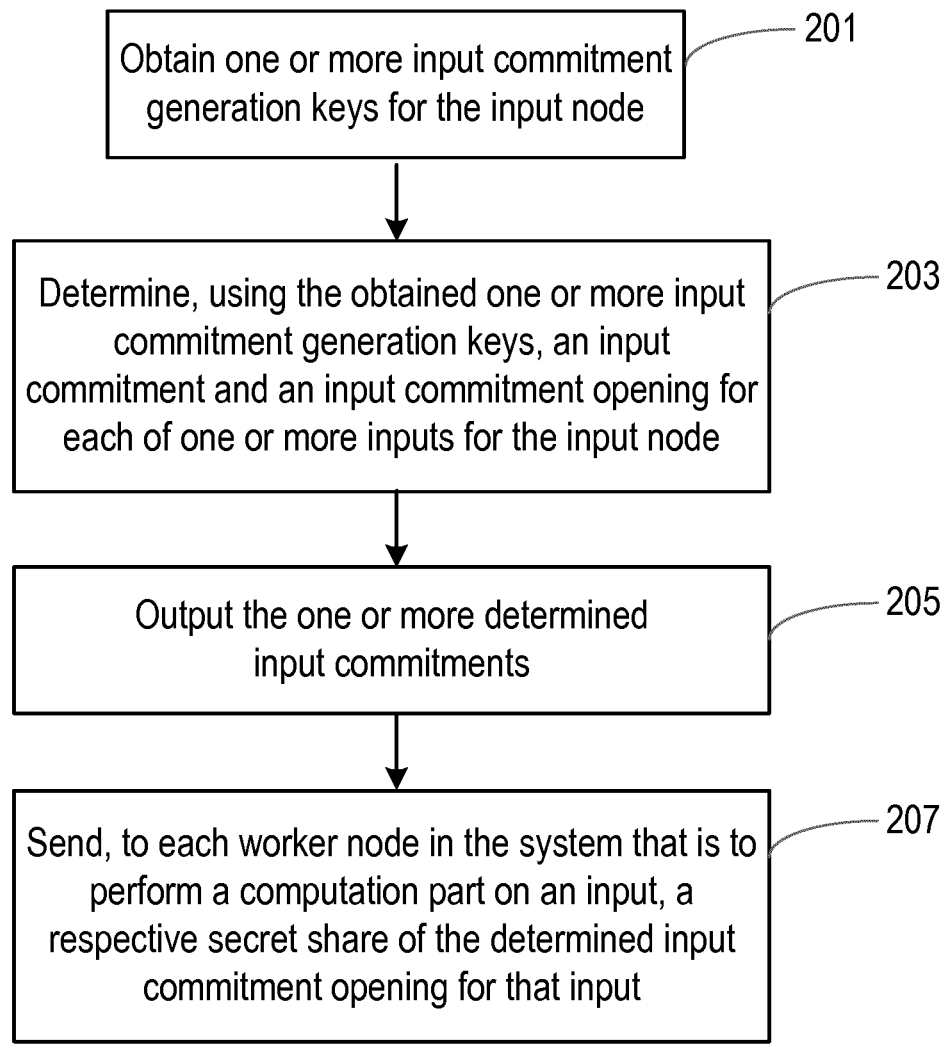
FIG. 4 is a flow chart illustrating exemplary operations of an input node according to various embodiments.

Turning now to FIG. 4, FIG. 4 is a flow chart that illustrates the steps in the method or steps in the operation of an input node 6. The steps can be performed by the processing unit 22 and/or the interface circuitry 20 as appropriate. In some embodiments, the processing unit 22 can perform the steps as a result of executing suitable program code stored in the memory unit 24.

The input node 6 has one or more inputs for a computation that is to be performed. An input may comprise any data that is required for a computation. The input may be private to the input node 6 (e.g. the data may be secret), or the input node 6 may not otherwise wish to reveal the input that it has provided to the computation (e.g. the input node 6 may select a subset of its available data for the computation, but does not want to reveal which data was selected).

As noted above, the computation comprises a plurality of parts. The computation parts may each be of a different type, of the same type or a combination (e.g. some computation parts are of the same type and other computation parts are of a different type). The input node 6 may provide an input to more than one computation part in the computation. In that case, the input provided by the input node 6 may be the same or different for each computation part. In embodiments where the system 2 comprises a plurality of input nodes 6 that each provide one or more inputs to a particular computation, multiple input nodes 6 may provide an input to any particular computation part.

In a first step, step 201, the input node 6 obtains one or more input commitment generation keys for the input node 6. As described above with reference to the central authority node 4, the central authority node 4 generates the input commitment generation keys and publishes them. Thus, in step 201, the input node 6 accesses the published input commitment generation keys (indicated or represented by signal 30 in FIG. 1).

Where the input node has a plurality of inputs for the computation, the input node 6 may obtain a respective input commitment generation key for each of the inputs (i.e. the central authority node 4 has generated a respective input commitment generation key for each of the inputs), or alternatively the input node 6 may obtain a single input commitment generation key for use with each of the plurality of inputs (i.e. the central authority node 4 has generated a single input commitment generation key for use with any input). As another alternative, the input node 6 may use a particular input commitment generation key for two or more inputs, and another input commitment generation key for one or more other inputs.

In embodiments where the input node 6 is to provide an input to two or more computation parts, the input node 6 may obtain a respective input commitment generation key for each of the two or more computation parts (i.e. the central authority node 4 has generated a respective input commitment generation key for each of the computation parts that the input node 6 is to provide an input to).

When the input node 6 is to provide an input to the computation, in step 203, the input node 6 determines an input commitment and an input commitment opening for each of the one or more inputs using the obtained one or more input commitment generation keys.

In some embodiments, the input commitment scheme used to generate the input commitment generation keys supports reuse of input commitments in multiple computation parts. That is, input commitments generated by an input node 6 using the input commitment generation keys are not dependent on the computation part that the input is to be provided to.

In step 205, the input node 6 outputs the one or more determined input commitments. In particular, the input node 6 makes the one or more input commitments available for at least the recipient node(s) 10 in the system 2. Where there are multiple recipient nodes 10, the input node 6 can publish the one or more input commitments. Where there is a single recipient node 10, the input node 6 can send the one or more input commitments to the recipient node 10. Publishing the one or more input commitments can mean storing them in a location that is accessible by the recipient (and potentially other) nodes 4, 6, 8, 10, for example in memory unit 24 if that is accessible by the other nodes 4, 6, 8, 10, or storing them on a server or other computer that is accessible via the Internet or other network.

In step 207 (which can happen before, at the same time, or after step 205), for a particular input to the computation, the input node 6 sends a respective secret share of the input commitment opening for that input to each of the worker nodes 8 in the system 2 that are to perform a computation part on that input. Thus, if the first committee 12 of worker nodes 8 are to perform a computation part on the input, the input node 6 sends a respective secret share of the input commitment opening for that input to each of the worker nodes 8 in the first committee 12. This is indicated in FIG. 1 by signal 36 from the input node(s) 6 to the first committee 12.

Thus, after determining the input commitment opening(s) in step 203, the input node 6 determines a plurality of secret shares of each input commitment opening, with a respective secret share being generated for each worker node 8 in the committee that is to use the input in a computation part. Thus, the worker nodes 8 in the committee are able to reconstruct the input commitment opening as part of the computation part (using MPC techniques so that no individual worker node 8 is able to find out the input commitment opening directly).

In the event that the input node 6 is to provide the input (or another input) to another computation part (e.g. performed by the second committee 14 in FIG. 1), the input node 6 can provide respective secret shares of the input commitment opening to each of the worker nodes 8 in that second committee 14, which is indicated by signal 36 from input node 6 to second committee 14 in FIG. 1. In that case, the input commitment opening provided to the first committee 12 can be the same as the input commitment opening provided to the second committee 14.

As noted below, the worker nodes 8 can also make use of the input commitment(s), and signal 36 in FIG. 1 also represents the transfer of the input commitment(s) to the worker nodes 8.

Also as noted below, the recipient node(s) 10 make use of the input commitment(s), and signal 37 in FIG. 1 represents the transfer of the input commitment(s) to the recipient node(s) 10.

Figure 5:
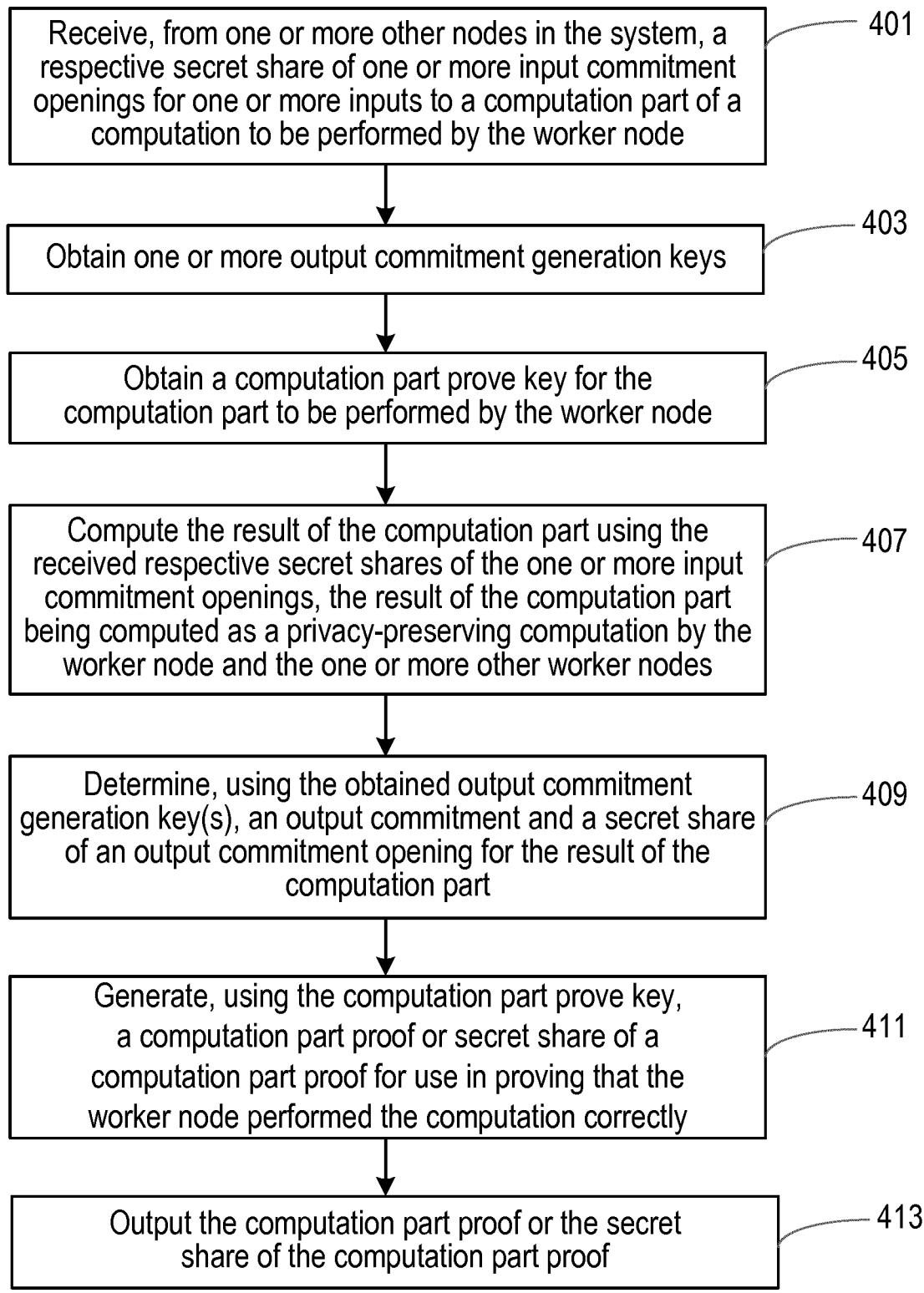
FIG. 5 is a flow chart illustrating exemplary operations of a worker node according to various embodiments.

Turning now to FIG. 5, FIG. 5 is a flow chart that illustrates the steps in the method or steps in the operation of a worker node 8 that is part of a committee with one or more other worker nodes 8, and that is to perform a computation part of the computation. In general (and unless otherwise indicated below) FIG. 5 applies the operation of a worker node 8 in performing a computation part on an input from an input node 6 and to the operation of a worker node 8 in performing a computation part on a shared block output from another committee that performed a different computation part, or to any combination thereof (e.g. to the operation of a worker node 8 in performing a computation part on an input from an input node 6 and a shared block output from another committee, etc.). Also as unless otherwise indicated below, FIG. 5 applies the operation of a worker node 8 in performing a computation part to generate an output for a recipient node 10 and to the operation of a worker node 8 in performing a computation part to generate a shared block for use by another committee that is to perform a different computation part on the shared block, or to any combination thereof (e.g. to the operation of a worker node 8 in performing a computation part to generate an output for both a recipient node 10 and another committee that is to perform a different computation part on the output (shared block)).

It will be appreciated that each worker node 8 in a committee will operate as shown in FIG. 5 and described below. The steps can be performed by the processing unit 22 and/or the interface circuitry 20 as appropriate. In some embodiments, the processing unit 22 can perform the steps as a result of executing suitable program code stored in the memory unit 24.

In a first step, step 401, the worker node 8 receives a respective secret share of one or more input commitment openings for one or more inputs to a computation part of a computation to be performed by the worker node. As indicated above, the input commitment opening may be a commitment opening from an input node 6 relating to an input by the input node 6 (indicated by signal 36 in FIG. 1), or it may be a commitment opening of a shared block commitment from another committee of worker nodes 8 (indicated by signal 38 in FIG. 1).

The worker node 8 also obtains one or more output commitment generation keys (step 403). As described above with reference to the central authority node 4, the central authority node 4 generates one or more shared block commitment generation keys and one or more output commitment generation keys and publishes them. Thus, in step 403, the worker node 8 accesses the published commitment generation keys (indicated or represented by signal 32 in FIG. 1). Where the worker node 8 is to provide the output of the computation part to a recipient node 10, the worker node 8 obtains the output commitment generation key(s) relevant to that computation part/recipient node 10, and where the worker node 8 is to provide the output of the computation part to another committee of worker nodes 8, the worker node 8 obtains the shared block commitment generation key(s) relevant to that computation part/next committee of worker nodes 8.

As described above, in some embodiments, the output commitment scheme the central authority node 4 used to generate the output commitment generation keys supports reuse of output commitments in multiple computation parts.

The worker node 8 also obtains a computation part prove key for the computation part to be performed by the worker node 8 (step 405). As noted above, the computation part proving scheme used by the central authority node 4 to generate the computation part prove key supports reuse of commitments in multiple computation part proofs of different types of computation. Thus, in step 405, the worker node 8 accesses the published computation part prove key(s) (indicated or represented by signal 32 in FIG. 1).

Next, the worker node 8 computes the result of the computation part using the received respective secret share of the one or more input commitment openings (step 407). The worker node 8 computes the result of the computation part as a privacy-preserving computation with the one or more other worker nodes in the committee for that computation part. Those skilled in the art will be aware of various type of privacy-preserving computation techniques that can be used to perform the computation part, and further details are not provided herein.

Performing the computation part results in one or more outputs (which as noted above may be or include an output for a recipient node 10 and/or a shared block for another committee of worker nodes 8), and the worker node 8 determines a secret share of an output commitment (or the output commitment itself) and a secret share of an output commitment opening for the result of the computation part (step 409). These are generated using the one or more output commitment generation keys obtained in step 403.

In some embodiments, the worker node 8 can output the output commitment or the secret share of the output commitment and/or the secret share of the output commitment opening. These can be output to another committee of worker nodes 8 (as indicated by signal 38 in FIG. 1) and/or a recipient node 10 (as indicated by signal 42 from the second committee 14 in FIG. 1) as appropriate. In particular, in the case where the output of the computation part is a shared block to be input to another computation part, the output commitment or secret share of the output commitment is sent to the recipient node(s) 10, and the secret share of the output commitment opening can be sent to the next committee of worker nodes 8. In the case where the output of the computation part is an output of the overall computation, the output commitment or secret share of the output commitment and the secret share of the output commitment opening is sent to the recipient node(s) 10. The outputting can include publishing the secret share of the output commitment.

In some embodiments, the worker node 8 can determine the output commitment by cooperating with the other worker nodes 8 in the committee to determine the output commitment (e.g. by combining their respective secret shares of the output commitment), and the worker node 8 can output the determined output commitment. In this case, the determined output commitment can be published by the worker node 8 (with publishing being as described above) or sent to the recipient node(s) 10.

Next, in step 411, the worker node 8 generates, using the computation part prove key, a computation part proof or a secret share of a computation part proof for use in proving that the worker node 8 (or committee of worker nodes 8) performed the computation part correctly with respect to the one or more input commitment openings used in the computation part and the output commitment openings that were determined as a result of the computation part.

Finally, in step 413, the worker node 8 can output the computation part proof or the secret share of the computation part proof. The computation part proof or the secret share of the computation part proof can be output to the recipient node(s) 10, as indicated by signal 40 in FIG. 1 for the first committee 12 and signal 42 in FIG. 1 for the second committee 14. The determined computation part proof or the secret share of the computation part proof can be published by the worker node 8 (with publishing being as described above) or sent to the recipient node(s) 10.

In some embodiments, in step 411 the worker node 8 can determine a secret share of the computation part proof and cooperate with the other worker nodes 8 in the committee to determine the computation part proof (e.g. by combining their respective secret shares of the computation part proof), and the worker node 8 can output the determined computation part proof in step 413.

It will be appreciated that step 411 may be performed when (or around the same time as) steps 407 and 409 are performed. Alternatively, step 411 (and indeed optionally step 409) may be performed when a computation proof is required (which may be any time after the computation has been performed, e.g. days or weeks after), and thus step 411 can be performed in response to a request for a proof to be provided.

In some embodiments, the worker node 8 also performs the following steps relating to commitments to the input(s) to the computation part, before proceeding with the computation of the result of the computation part in step 407.

Firstly, the worker node 8 can obtain one or more input commitments for the one or more inputs. The input commitments are either published by the input node(s) 6 or provided from another committee, either as a published (shared block) commitment or in the form of respective secret shares of the (shared block) commitment sent by the worker nodes 8 in the other committee.

The worker node 8 performs a check with the one or more other worker nodes 8 in the committee that the secret shares of the one or more input commitment openings received in step 401 correspond to the one or more input commitments. The worker node 8 performs this check interactively in a privacy-preserving way with the other worker nodes 8 in the committee. In some embodiments, this check makes use of the input commitment generation key (in which case the worker node 8 obtains this key from the central authority node 4 in a similar way to the other keys described above), and essentially the input commitment is rebuilt from respective secret shares of the input commitment openings as part of a multiparty computation and the worker nodes 8 check that the rebuilt input commitment matches the published input commitment.

If the check is passed (i.e. if the rebuilt input commitment(s) correspond to the one or more input commitments), then worker node 8 can proceed with step 407. If the check is failed, the worker node 8/committee can output an error to any of the nodes 4, 6, 8, 10 in the system indicating that the check has failed.

Figure 6:
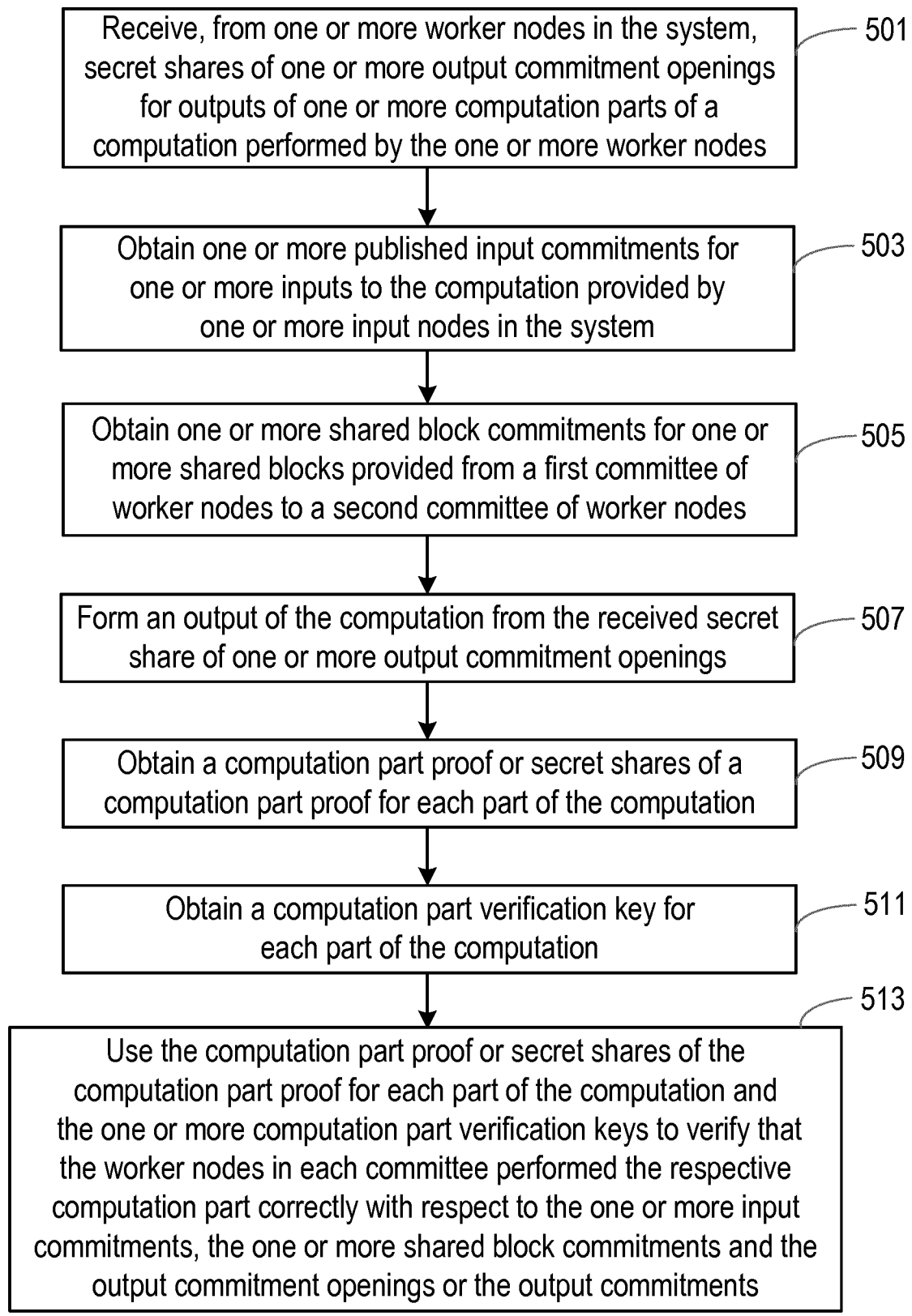
FIG. 6 is a flow chart illustrating exemplary operations of a recipient node according to various embodiments.

Turning now to FIG. 6, FIG. 6 is a flow chart that illustrates the steps in the method or steps in the operation of a recipient node 10 that is to receive the output of the computation (or an output of the computation if there are multiple outputs that are provided to different recipient nodes 10).

The steps in FIG. 6 can be performed by the processing unit 22 and/or the interface circuitry 20 as appropriate. In some embodiments, the processing unit 22 can perform the steps as a result of executing suitable program code stored in the memory unit 24.

In step 501, the recipient node 10 receives secret shares of one or more output commitment openings for outputs of one or more computation parts in the computation (e.g. as shown by signal 42 in FIG. 1).

The recipient node 10 obtains one or more published input commitments for one or more inputs that were provided by one or more input nodes 6 (step 503). The provision of the input commitments from the input node(s) 6 to the recipient node(s) 10 is shown by signal 37 in FIG. 1 and as described above.

The recipient node 10 also obtains one or more shared block commitments for one or more shared blocks provided from a first committee 12 of worker nodes 8 to a second committee 14 of worker nodes 8 (step 505). The provision of the shared block commitments to the recipient node(s) 10 is shown by signal 40 in FIG. 1.

It will be appreciated that steps 501, 503 and 505 can occur at generally the same time and/or in any order. Alternatively, step 505 can occur at the same time as step 509 below.

In step 507, the recipient node 10 forms an output of the computation from the received secret share of the one or more output commitment openings. This step comprises reconstructing the one or more output commitment openings from the received secret shares.

When the recipient node 10 is to verify that the computation has been performed correctly, the recipient node 10 obtains a computation part proof or secret shares of a computation part proof for each part of the computation from the worker nodes 8 in the system 2 (step 509). As noted above, FIG. 1 shows these computation part proofs or secret shares of a computation part proof being provided to the recipient node 10 in signals 40 and 42.

As part of the verification, the recipient node 10 obtains a computation part verification key for each part of the computation (step 511). As described above, the computation part verification key(s) are determined and published by the central authority node 4 and signal 34 in FIG. 1 represents the computation part verification key(s) being provided to the recipient node 10. In some embodiments, there is a single computation part verification key for all parts of the computation (or, put another way, the computation part verification keys for the computation parts are the same). In alternative embodiments, there is a respective computation part verification key for each type of computation part (e.g. there is a shared or common verification key that is used by all computation parts that execute the same function).

In step 513, the recipient node 10 then uses the computation part proof or secret shares of the computation part proof for each part of the computation and the one or more computation part verification keys to verify that the worker nodes 8 in each committee performed the respective computation part correctly with respect to the one or more input commitments, the one or more shared block commitments and the output commitment openings or the output commitments.

Thus, the recipient node 10 is able to verify whether or not the computation has been performed correctly.

In some embodiments, the computation provides outputs to one or more other recipient nodes 10. In that case, as part of the verification of the computation, the recipient node 10 obtains one or more published output commitments for one or more outputs from the computation that are provided to those other recipient nodes. These output commitments were published by the relevant committees of worker nodes 8, and so can be accessed by the recipient node 10.

In some embodiments, the recipient node 10 checks the correctness of the various commitments generated through the computation before forming (or trusting) the output of the computation.

Thus, the recipient node 10 obtains a shared block commitment verification key for each shared block commitment, an input commitment verification key for each published input commitment and an output commitment generation key for each received output commitment opening. As noted above, these keys are determined and distributed (e.g. published) by the central authority node 4, and the recipient node 10 obtaining these keys is represented by signal 34 in FIG. 1.

The recipient node 10 then checks the correctness of the published input commitments and the shared block commitments using the input commitment verification key and the shared block commitment verification key, respectively.

If the check is passed, then the recipient node 10 can proceed with step 507 and form the output of the computation.

In embodiments where the computation provides outputs to one or more other recipient nodes 10, before forming the output in step 507, the recipient node 10 can obtain one or more published output commitments for the one or more outputs provided to the other recipient node(s) 10, obtain an output commitment verification key for each of the one or more published output commitments (e.g. obtain from the central authority node 4), and check the correctness of the published output commitment(s) using the output commitment verification key(s). If the correctness check is passed, the recipient node 10 can proceed with forming the output of the computation in step 507.

As another check before forming the output in step 507, the recipient node 10 can check that the one or more output commitment openings from the computation correspond to the one or more published output commitments. If the check is passed, the recipient node 10 can proceed with forming the output of the computation in step 507.

If any of the above checks are failed, then the recipient node 10 can output an error indication.

As noted above, the methods in FIGS. 3-6 are exemplary methods of providing a verifiable, distributed and privacy-preserving computation. Some more detailed implementations are provided below. In particular, the following description provides an embodiment, implementation or instantiation based on Trinocchio/Geppetto, and an embodiment, implementation or instantiation based on a commit-and-prove scheme.

Trinocchio-Based Implementation

Various embodiments may be realised as an extension to Trinocchio. The Trinocchio system may include the following entities performing the following tasks. It will be appreciated that in various embodiments, any party (node) may arbitrarily combine the tasks of inputter (input node 6), worker (worker node 8), and recipient (recipient node 10). As discussed, the computation proof may be built after-the-fact to achieve auditability of the computation. Below, some operations are annotated that may be performed after-the-fact when a proof is desired.

The central authority—This performs a one-time set-up of the computation system. This results in: public parameters; a computation prove key and computation verification key; for each inputter, an input commitment generation key and an input commitment verification key; and for each recipient, an output commitment evaluation key and an output commitment verification key. All keys are published. In various cases, "published" may mean disclosed (e.g., on a website) so that all parties in the system can access the information.

Inputter—The inputter provides input to the computation. An inputter uses the input commitment generation key to generate an input commitment and an input commitment opening. The input commitment is published and the input commitment opening is provided as input to the workers.

Worker—The worker performs the computation. Using multiparty computation, the workers perform the following tasks in a privacy-preserving way: (i) checking that the input commitment openings provided by the inputters correspond to the published input commitments; (ii) computing the result of the computation; (iii) using the output commitment evaluation key to generate output commitments and commitment openings for each recipient; (iv) publishing the output commitments, and disclosing the output commitment openings to the relevant recipients. When a proof is desired, the computation prove key is used to generate a computation proof showing that the computation was performed correctly. The proof is published.

Recipient—The recipient receives the computation output. The recipient receives output commitment opening from the workers, checks that it corresponds to the published output commitment, and checks correctness of all input commitments and output commitments using the input/output commitment verification keys. When a proof is desired, the recipient checks correctness of the computation proof with respect to these commitments and the computation verification key. If all checks pass, the recipient accepts the received output commitment opening as the computation result.

Figure 7:
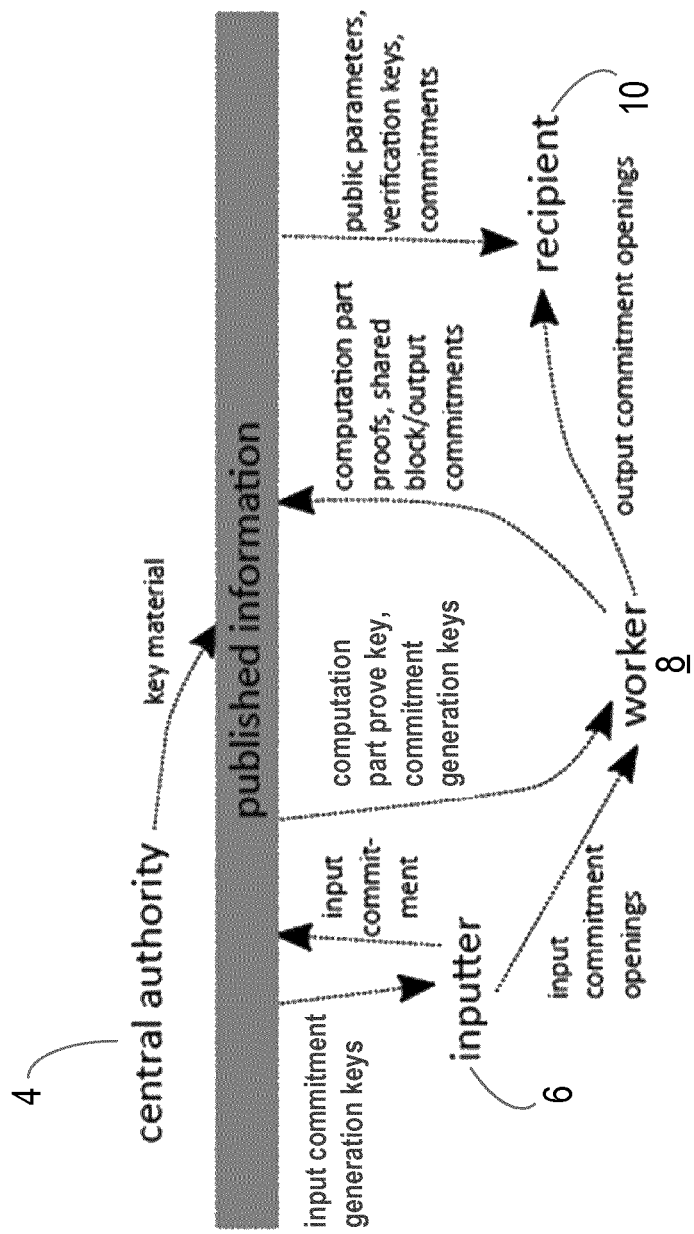
FIG. 7 is a diagram of a system according to specific embodiments.

The following adaptation of Trinocchio to distributed computations according to the techniques described herein is discussed with reference to FIG. 7. FIG. 7 shows an exemplary system similar to that shown in FIG. 1, and comprises a central authority 4, an inputter 6, a worker 8 and a recipient 10. FIG. 7 also shows some of the information/data exchanged between the nodes 4, 6, 8, 10.

As noted above, in a distributed computation, a computation is split into different parts, with outputs of some parts used as inputs of other parts. This is referred to as "shared block" between computation parts.

Central authority 4 in FIG. 7—Central authority 4 performs a one-time set-up of the computation system (e.g. as shown in step 101 above). This results in: public parameters; for each computation part, a computation part prove key; a (common) computation verification key; for each shared block, a shared block commitment generation key and a shared block commitment verification key; for each inputter/computation part combination, an input commitment generation key and an input commitment verification key; and for each recipient/computation part combination, an output commitment generation key and an output commitment verification key. All keys are published (e.g. as in step 103 above).

Inputter 6 in FIG. 7—The inputter 6 provides input to the computation parts. An inputter 6 uses the input commitment generation keys to generate input commitments and input commitment openings (e.g. as in step 203 above). The input commitments are published (e.g. as in step 205 above) and the input commitment openings are provided as input to the relevant workers 8 (e.g. as in step 207 above).

Worker 8 in FIG. 7—The worker 8 performs a computation part. Using multi-party computation in a committee 12, 14, the workers 8 perform the following tasks in a privacy-preserving way:

Checking that the input commitment openings provided by the inputters 6 correspond to the published input commitments;

Computing the result of the computation part (e.g. as in step 407 above)

Using the output commitment generation key to generate output commitments and commitment openings for each recipient 10 (e.g. as in step 409 above). The output commitments are published, and the output commitment openings are disclosed to the relevant recipients 10 (although this only applies if the output goes to the recipient 10).

Using the shared block commitment evaluation key to generate shared block commitments and commitment openings for each recipient. The shared block commitments are published, and the shared block commitment openings are disclosed to the relevant recipients (although this only applies if the output is processed further by another computation part).

When a proof is desired: using the computation part prove key to generate a computation part proof showing that the computation part was performed correctly (e.g. as in step 411 above). The proof is published (e.g. as in step 413 above).

Recipient 10 in FIG. 7—The recipient 10 receives the computation output. The recipient 10 receives output commitment openings from the workers 8 (e.g. as in step 501 above); checks that they correspond to the published output commitments; and checks correctness of all input commitments, shared block commitments, and output commitments using the input/shared block/output commitment verification keys. When a proof is desired: the recipient 10 checks correctness of the computation part proofs with respect to the relevant commitments and the computation verification key (e.g. as in step 513 above). If all checks pass, the recipient 10 accepts the received output commitment openings as the computation result.

Detailed Implementation of a Trinocchio/Geppetto-Based Implementation

In the following numbered sections, a protocol for verifiable computation is discussed that is based on quadratic arithmetic programs (QAPs) from "Pinocchio: Nearly Practical Verifiable Computation" (referred to below as [PHGR13]), "Trinocchio: Privacy-Friendly Outsourcing by Distributed Verifiable Computation" (referred to below as [SVdV15]) and "Geppetto: Versatile verifiable computation" (referred to below as [CFH15]).

1 Verifiable Computation from (Multi)QAPs 1.1 Modelling Computations as Quadratic Arithmetic Programs A quadratic arithmetic program (QAP) over a field F is a triple $(V, W, Y) \in F^{d \times k}$, where d is called the degree of the QAP and k is called the size. A vector $\vec{x} \in F^k$ is said to be a solution to the QAP if $(V \cdot \vec{x}) \times (W \cdot \vec{x}) = Y \cdot \vec{x}$, where x denotes the pairwise product.

Fix k. Let $S \subset \{1, \ldots, k\}$. The span of S is defined, denoted $F^S$ to be the set of vectors $\vec{x}$ with nonzero entries only in the indices of S. I.e. $F^S = \{\vec{x} \in F^k | \vec{x}_i = 0 \forall i \notin S\}$.

1.2 Commit-and-Prove Based on QAPs

Fix a QAP Q. A commit-and-prove scheme is defined that allows pairwise addition, and proofs that: 1) given a set S, a commitment is valid with respect to S, i.e. it is a valid commitment to a vector $\vec{x}$ and $\vec{x}$ is in the span of S; 2) a commitment is to a vector $\vec{x}$ that is a solution to Q.

Assume discrete logarithm groups $G_1$, $G_2$, $G_3$ with a pairing e: $G_1 \times G_2 \to G_3$ for which the (4d+4)-PDH, d-PKE and (8d+8)-SDH assumptions [PHGR13] hold, with d the degree of the QAP. Proofs are the CRS model, where parts of the CRS are needed for proving statements and other parts are needed for verifying statements, but both may be seen by all parties. Fix d distinct, public $\omega_1, \ldots, \omega_d \in F$. Let $t = (x - \omega_1) \cdot \ldots \cdot (x - \omega_d) \in F[x]$. Fix random, secret s, $\alpha_v, \alpha_w, \alpha_y, r_v, r_w, r_y = r_v \cdot r_w \in F$. Given generators $g_1$ of $G_1$ and $g_2$ of $G_2$ (written additively) and polynomial $f \in F[x]$, $\langle f \rangle_1$ is written for $f(s) \cdot g_1$ and $\langle f \rangle_2$ for $f(s) \cdot g_2$.

The commitment scheme is as follows. Let $v_1(x), \ldots, v_k(x) \in F[x]$ be the unique polynomials of degree $<d$, obtained by Lagrange interpolation, such that $v_i(\omega_j) = V_{j,i}$, and similarly $w_i(\omega_j) = W_{j,i}, y_i(\omega_j) = Y_{j,i}$. A commitment to $\vec{x} \in F^k$ with randomness $(\delta_v, \delta_w, \delta_y)$ is given by $(\langle V \rangle_1, \langle W \rangle_2, \langle Y \rangle_1)$ with:

$$\langle V \rangle_1 = \sum_{i=1}^{k} x_i \cdot \langle r_v v_i \rangle_1 + \delta_v \cdot \langle r_v t \rangle_1,$$

$$\langle W \rangle_2 = \sum_{i=1}^{k} x_i \cdot \langle r_w w_i \rangle_2 + \delta_w \cdot \langle r_w t \rangle_2,$$

$$\langle Y \rangle_1 = \sum_{i=1}^{k} x_i \cdot \langle r_y y_i \rangle_1 + \delta_y \cdot \langle r_y t \rangle_1,$$

All constants $\langle r_v v_1 \rangle_1, \ldots, \langle r_y t \rangle_1$ are in the CRS.

To prove that a commitment is a valid commitment in the span of a set S, i.e. $\langle V \rangle_1, \langle W \rangle_1, \langle Y \rangle_1$ all use the same $\vec{x}$ and this $\vec{x}$ is in the span of S, a prover provides values $(\langle \alpha_v V \rangle_1, \langle \alpha_w W \rangle_2, \langle \alpha_y Y \rangle_1, \langle Z \rangle_1)$ with:

$$\langle \alpha_v V \rangle_1 = \sum_{i=1}^{k} x_i \cdot \langle r_v \alpha_v v_i \rangle_1 + \delta_v \cdot \langle r_v \alpha_v t \rangle_1$$

$$\langle \alpha_w W \rangle_2 = \sum_{i=1}^{k} x_i \cdot \langle r_w \alpha_w w_i \rangle_2 + \delta_v \cdot \langle r_w \alpha_w t \rangle_2$$

$$\langle \alpha_y Y \rangle_1 = \sum_{i=1}^{k} x_i \cdot \langle r_y \alpha_y y_i \rangle_1 + \delta_v \cdot \langle r_y \alpha_y t \rangle_1$$

$$\langle Z \rangle_1 = \sum_{i=1}^{k} x_i \cdot \langle r_v \beta_S v_i + r_w \beta_S w_i + r_y \beta_S y_i \rangle_1 +$$
$$\delta_v \cdot \langle r_v \beta_S t \rangle_1 + \delta_w \cdot \langle r_w \beta_S t \rangle_1 + \delta_y \cdot \langle r_y \beta_S t \rangle_1,$$

where again the constants $\langle r_v \alpha_v v_1 \rangle_1, \ldots, \langle r_y \beta_S t \rangle_1$ are in the CRS.

To verify that the commitment is valid, a verifier checks that:

$e(\langle V \rangle_1, \langle \alpha_v \rangle_2) = e(\langle \alpha_v V \rangle_1, \langle 1 \rangle_2);$ $e(\langle \alpha_w \rangle_1, \langle W \rangle_2) = e(\langle \alpha_w W \rangle_1, \langle 1 \rangle_2);$ $e(\langle Y \rangle_1, \langle \alpha_y \rangle_2) = e(\langle \alpha_y Y \rangle_1, \langle 1 \rangle_2);$ $e(\langle V \rangle_1 + \langle Y \rangle_1, \langle_S \rangle_2) \cdot e(\langle \beta_S \rangle_1, \langle W \rangle_2) = e(\langle Z \rangle_1, \langle 1 \rangle_2).$ (1)

Proving that a commitment $\langle V \rangle_1, \langle W \rangle_2, \langle Y \rangle_1$ to vector $\vec{x}$ with randomness $(\delta_v, \delta_w, \delta_y)$ is a solution to QAP Q is equivalent to proving that target polynomial t(x) divides the polynomial $p(x) = (\Sigma_i x_i \cdot v_i(x)) \cdot (\Sigma_i x_i \cdot w_i(x)) - (\Sigma_i x_i \cdot y_i(x))$. $\langle V \rangle_1, \langle W \rangle_2$ and $\langle Y \rangle_1$ represent evaluations "in the exponent" of $\Sigma_i x_i \cdot v_i(x), \Sigma_i x_i \cdot w_i(x)$, and $\Sigma_i x_i \cdot y_i(x)$ in secret point s. (With randomness added that needs to be compensated for.) The idea to prove that t(x) divides p(x) is to compute quotient polynomial h(x)=p(x)/t(x) and also provide an evaluation "in the exponent" of h(x), such that the equation $h(x) \cdot t(x) = p(x)$ can be verified using the pairing. More precisely, let $h(x) = p(x)/t(x) + \Sigma_{i=1}^{k} \delta_v x_i \cdot w_i(x) + \Sigma_{i=1}^{k} \delta_w x_i \cdot v_i(x) + \delta_v \delta_w \cdot t(x) - \delta_y$, and write $h(x) = \Sigma_{i=0}^{d-1} h_i \cdot x^i$. The proof that $\vec{x}$ is a solution to QAP Q is simply $$\langle H \rangle 1 = \sum_j \langle s^j \rangle_1 \cdot h_j.$$

This proof is verified by checking that:

$e(\langle V \rangle_1, \langle W \rangle_2) \cdot e(\langle Y \rangle_1, \langle 1 \rangle_2)^{-1} = e(\langle H \rangle_1, \langle r_y t \rangle_2)$ (2)

1.3 Pinocchio: Verifiable Computation Using QAPs

Given function $f: F^l \to F^m$, QAP Q of size $n \geq l+m$ is said to encode $f$ if it is true that $\vec{y} = f(\vec{x})$ iff there exists $\vec{z}$ such that $(\vec{x}, \vec{y}, \vec{z})$ is a solution to Q. Clearly, every function can be encoded by a QAP: write the function as an arithmetic circuit, let $\vec{z}$ represent internal wires of the circuit and let each row of the matrices V, W, Y denote a multiplication gate. However, note that not all natural QAPs are arithmetic circuits. For instance, consider the function $f: F \to F^k$ such that $y_0, \ldots, y_{k-1} = f(x)$ is the k-bit bit decomposition of $0 \leq x < 2^k$. A simple QAP for this consists of equations $y_i \cdot (1 -$ $y_i)=0$, $x=y_0+2y_1+\cdots+2^{k-1}y_{k-1}$ [PHGR13]; but this QAP is not an arithmetic circuit starting from x. Fixing a QAP that encodes $f$, $f'$ denotes the (any) function that returns $\vec{z}$ in addition to $\vec{y}$.

Pinocchio uses a QAP that computes $f$ to allow efficient outsourcing of computations $\vec{y}=f(\vec{x})$. The client provides $\vec{x}$ to the server. The server computes $f'(\vec{x})$, i.e., $\vec{y}=f(\vec{x})$ and $\vec{z}$ such that $(\vec{x},\vec{y},\vec{z})$ is a solution to Q. Let S={1+m+1, ..., n} be the variables of $\vec{x}$ that do not belong to $\vec{x}$ or $\vec{y}$. The server generates a commitment $C_z=(\langle V_z \rangle_1, \langle W_z \rangle_1, \langle Y_z \rangle_1)$ to $\vec{z}$ and a proof that it is valid with respect to S. Moreover, let $C_{xy}=(\langle V_{xy} \rangle_1, \langle W_{xy} \rangle_2, \langle_{xy} \rangle_1)$ denote a commitment to $\vec{x}+\vec{y}$ without any randomness. The server then generates a proof that $C_{xy}+G=(\langle V_{xy} \rangle_1+\langle V_z \rangle_1, \langle W_{xy} \rangle_2+\langle W_z \rangle_2, \langle_{xy} \rangle_1+\langle Y_z \rangle_1)$ is a solution to Q. The server provides $\vec{y}$ and the commitments and proofs to the client. The client reconstructs $C_{xy}+C_z$ from $\vec{x}$, $\vec{y}$, and $C_z$ and checks that $C_{xy}$ is valid with respect to s and that $C_{xy}+C_z$ represents a solution to Q.

QAPs represent equations v·w=y where v, w, y are linear combinations in the variables. In many natural cases, it is desired to use constants in proofs, e.g., $v=\Sigma_i c_i \cdot x_i+c_0$. This is achieved by having the client append a one to its input vector at location l'=l+1 and writing $c_0$ as $c_0 \cdot x_{l'}$.

1.4 Trinocchio: Multiple Inputs and Distributed Proving

Trinocchio [SVdV15] improves Pinocchio in two main ways. First, [SVdV15] performs computations in a privacy-preserving way using multi-party computation in a committee of multiple servers (workers). Specifically, $f'$ is computed using passively secure MPC based on Shamir secret sharing; from the secret shares of $\vec{y}$, $\vec{z}$ that this gives, the Pinocchio proof can be computed locally by each of the servers. Essentially, the computation of the Pinocchio proof has multiplicative depth one (the only multiplication occurring when computing v(x)·w(x) for the quotient polynomial), so each server can simply compute the Pinocchio proof as above on Shamir secret shares; the result is an additive sharing of the Pinocchio proof that the client can reconstruct and verify.

Second, [SVdV15] considers the setting where the function $f$ contains sensitive inputs from multiple inputters. That is, suppose clients 1, ... p with inputs $\vec{x}_1 \in F^{l_1}, \ldots, \vec{x}_p \in F^{l_p}$ want to compute $f:F^{l_1+\cdots+l_p} \to F^m$. Let Q be a QAP for $f$ and let $S_1=\{1, \ldots, l_1\}$, $S_2=\{l_1+1, \ldots, l_1+l_2\}$, etcetera and $S_0=\{l_1+\cdots+l_p+m+1, \ldots, n\}$.

In the single-server case, $f$ can be computed as follows. First, all clients i announce commitments $C_i$ to their inputs $\vec{x}_i$ (embedded in $F^n$) and prove correctness of their inputs with respect to $S_i$. Then, they provide their inputs and commitment randomness to the server. The server computes $\vec{y}$, $\vec{z}$ such that $\vec{x}_1, \ldots, \vec{x}_p, \vec{y}, \vec{z}$ is a solution to the QAP. It computes commitment $C_z$ to Z and a proof that it is correct with respect to $S_0$. Let $C_y$ denote a commitment to $\vec{y}$ without randomness. The server finally proves that $C_1+\ldots+C_p+C_y+C_z$ (which is a commitment to $\vec{x}_1, \ldots, \vec{x}_p, \vec{y}, \vec{z}$ with randomness the sum of the client and server randomness) is a solution to the QAP, and publishes the $C_z$, $\vec{y}$ and the proofs. The clients check correctness of all commitments, reconstruct $C_1+\ldots+C_p+C_y+C_z$ using $C_1, \ldots, C_p$, $C_z$ and $\vec{y}$ and accept $\vec{y}$ if the commitments and proof are correct.

As in the single-inputter case, the server's work can be performed in a privacy-preserving way by multiple servers using multi-party computation based on Shamir secret sharing. In this case, to make sure that the additive sharing of the Pinocchio proof does not leak anything about its inputs, this sharing is re-randomised with an additive sharing of 0 before being opened to the client.

1.5 Geppetto: Merging Multiple QAPs into One

The central observation of Geppetto [CFH15] is that it is possible to combine multiple QAPs into a single QAP with controlled overlap between the wires. This allows multiple independent proofs on a common set of values.

For instance, suppose there is a function $f$ and QAP $Q^1=(V^1; W^1; Y^1)$ such that y=$f$(x) if there exists $\vec{u}$ such that (x, y, $\vec{u}$) is a solution to $Q^1$. Similarly, suppose that b=g(a) if there exists $\vec{v}$ such that (a, b, $\vec{v}$) is a solution to $Q^2=(V^2,W^2,Y_2)$. Using Geppetto, a proof can be made that $g \circ f$ was computed correctly by first creating a proof that $f$ was computed correctly, then creating a proof that g was computed correctly on the output of $f$. Alternatively a circuit for function $g \circ f$ could be created directly. Compared to this, the Geppetto approach allows different parties to provide the proofs for $f$ and g, and it allows more flexibility, e.g. it allows verifying iterative algorithms where the number of iterations is not known beforehand.

To build a QAP for $g \circ f$, consider the QAP Q=($V^1|V^2$, $W^1|W^2$, $Y^1|Y^2$), where A|B denotes placing the two matrices next to each other, adding rows with zeros to A or B to make them the same height. Observe that if (x, y, $\vec{u}$) is a solution to $Q^1$, then (x, y, $\vec{u}$, 0, ..., 0) is a solution to Q; and if (a,b, $\vec{v}$) is a solution to $Q^2$, then (0, ..., 0, a, b, $\vec{v}$) is a solution to Q as well. Hence we can use Q both to prove that $f$ was computed correctly and that g was computed correctly. Now, we still need to guarantee that the output of $f$ is used as the input of g. To this end, a glue variable G is introduced, and rows added to Q representing equation y+a−G=0, i.e., row (0, ..., 0) to V, (0, ..., 0) to W, and (0, 1, 0, ..., 0, 1, 0, ..., 0, −1) to Y. Note that, when a=0 (e.g., when verifying a proof on a set S of variable indices that does not include a), this equation is y=G; and when y=0, it is a=G. Hence including G in proofs on the variables of $Q_1$ and $Q_2$ guarantees that indeed y=a.

As proof that b=g($f$(x)), the server provides commitments $C_f$ to (y, $\vec{u}$), $C_g$ to (a, $\vec{v}$), and $C_G$ to G; and proofs that they are correct with respect to the appropriate sets of indices; the output value b; and proofs that $C_x+C_f+C_G$ and $C_g+C_G+C_b$ are solutions to Q. Here, $C_x$ and $C_b$ are commitments without randomness to values x and b that the client recomputes.

1.6 Flexible Gluing in Geppetto

Above, to "glue" variable y from a QAP $Q_1$ and variable a from a QAP $Q_2$, a variable G is introduced and equation y+a−G. Now suppose it is desired to glue two variables x, y from $Q_1$ to the same variable a from two different instances of QAP $Q_2$. This occurs naturally, for example, if a function $f$ calls a function g twice with different parameters.

Solution 1: Selector variable inside QAP—The solution to this problem that is probably adopted in the MapRedude example from [CFH15] is to glue x and y to different copies $a^1$, $a^2$ of a, and introduce an additional selection variable s: if s=1 then a is equated to $a^1$ and if s=2 then a is equated to $a^2$. In more detail, in the above scenario there are variables {x, y} in $Q_1$, variables {$M_1$, $M_2$, a, a', $a^1$, $a^2$} in $Q_2$, and glue variables $G^1$, $G^2$. Glue equations x+$a^1$=$G^1$, x+$a^2$=$G^2$ are added. In $Q_2$, a is set to $a^1$ or $a^2$ depending on the value of s with the following equations (generalizing the "zero-equality gate" from [PHGR13]):

$$0 = a' \cdot (s-1)$$
$$a' - a^1 = (s-1) \cdot M_1$$
$$0 = a \cdot (s-2)$$
$$a - a' - a^2 = (s-2) \cdot M_2$$

It is verified that these equations hold if and only if $a' = \delta_{s,1} \cdot a^1$, $M_1 = (a'-a^1)(s-1)^{-1}$, $M_2 = (a-a'-a^2)(s-2)^{-1}$, and finally $a = \delta_{s,1} \cdot a^1 + \delta_{s,2} \cdot a^2$ as intended. If $Q_2$ is glued together at most M times to any other QAP, then this solution involves introducing M glue equations and M glue variables. Moreover, it involves adding 2M variables and 2M equations to $Q_2$; however, note that these equations do not involve glue so when combining QAPs $Q_1$ and $Q_2$, they can be put next to equations from $Q_1$ so they do not necessarily increase the QAP's degree.

Solution 2: Dynamically enabling glue equations—An alternative solution to this problem is to introduce additional variables that can be used to dynamically enable or disable glue equations. In the above setting, two variables $\alpha_1, \alpha_2$ can be introduced and the following glue equations:

$$0 = \alpha_1 \cdot (x+a-G_1)$$
$$0 = \alpha_2 \cdot (y+a-G_2)$$

The verifier sets $(\alpha_1, \alpha_2) = (1, 0)$ for the first instance of $Q_2$ to enable equation $x+a=G_1$; $(\alpha_1, \alpha_2) = (0, 1)$ for the second instance of $Q_2$ to enable equation $y+a=G_2$; and $(\alpha_1, \alpha_2) = (1, 1)$ for QAP $Q_1$ to enable both equations. This solution involves adding M glue variables and M glue equations, and M global "enable/disable" variables. Hence, this solution is slightly more efficient (and arguably less complicated) than the previous one.

Alternatives: Replicating or Phantom Functions—The easiest solution to this problem is simply to replicate QAP $Q_2$ M times. However, this means that all variables from $Q_2$ need to be replicated, increasing the (effort needed to produce the) evaluation key significantly, and a different verification key is needed for each invocation.

A final, conceptually simple solution is to introduce "phantom functions". Conceptually, with replication, copies $f^1, \ldots, f^M$ of $f$ are used when it is called different times from the same function. Here, instead of letting $f^2, \ldots, f^M$ being copies of $f$, $f^2(x)$ is defined to be the function that directly calls $f$ and returns whatever it returns. The advantage is that it is not necessary to replicate all variables, resulting in a smaller evaluation key. However, this solution is less efficient, in particular for the verifier, because the number of function calls increases: e.g., for the second invocation of $f$ proofs need to be built and verified both for $f^2$ and for its call to $f$.

Remark: All Glue can be in Same Commitment—Note that in each of the above solutions, if a QAP $Q_1$ shares variables with at most M instances of QAP $Q_2$, then each glue variable is replicated M many times. Note that all of these glue variables can be in the same commitment, i.e., different commitments for each instance of $Q_2$ are not needed. E.g. if $Q_1$ shares a set of variables with two instances of $Q_2$, then there are four commitments: $C_1$ for $Q_1$'s variables, $C_2$ for $Q_2$'s variables and G for all glue variables. It is only needed to verify once that G is correct with respect to the set of all glue variables.

2 Distributed Privacy-Preserving Verifiable Computation

This section describes how to adapt Geppetto to the distributed privacy-preserving setting described above with reference to FIGS. 3-6.

A distributed computation can be outsourced to several committees of ≥3 parties that each perform a part of the computation using multi-party computation protocols based on secret sharing. The idea is that the computation takes place on secret shares, and the parties of the previous committee pass on their shares to the parties of the next committee. There are two ways of doing this: either n parties copy their shares as-is, or t parties copy their shares and then re-share them among the n new computation parties.

When deploying Geppetto, the idea is that the multi-party computation takes place (almost) as before, but certain information is saved. When a proof is requested, this information is then used by each of the workers that participated at some stage in the computation, to produce a separate proof that its actions were performed correctly. The proofs of all of these individual workers are then combined to obtain an overall proof of correctness of the computation outcome.

Figure 8:
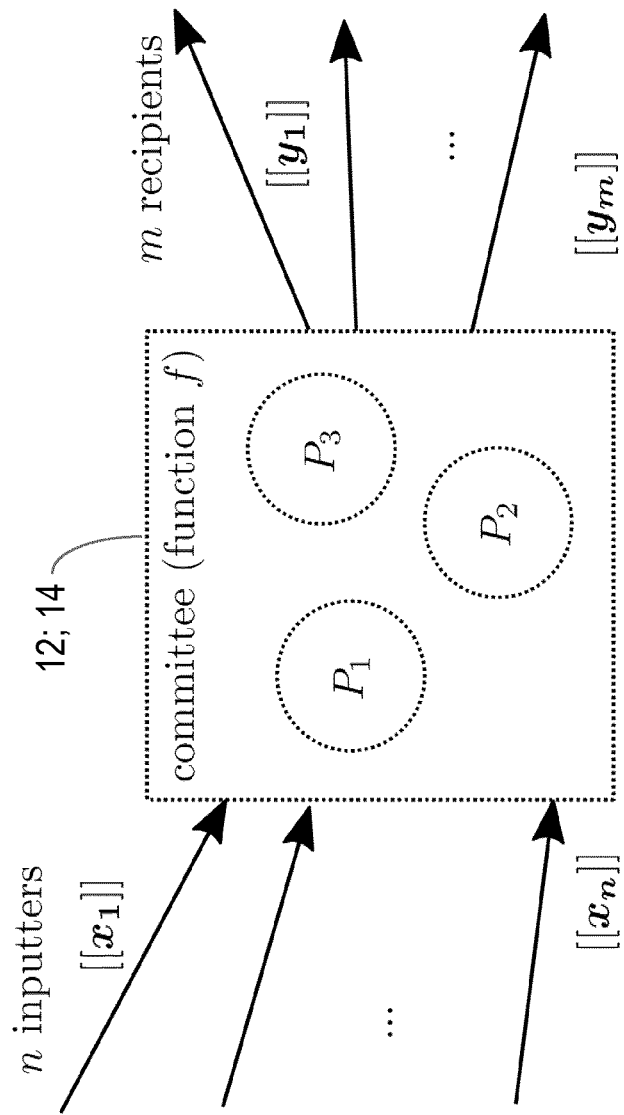
FIG. 8 is a diagram illustrating the inputs and outputs of a committee that evaluates a function.

Specifically, when using the above technique for performing a distributed computation without Geppetto, each worker in a committee 12, 14 gets as input secret shares of the inputs to the committee's computation part, as shown in FIG. 8. These shares may come from inputters 6 to the computation, from other committees 12, 14, or from a combination thereof. Similarly, the recipients 10 may also include the recipient of the overall computation result, in which the output is not shared among a committee but instead a single party gets all shares (this corresponds to step 501 in FIG. 6).

Figure 9:
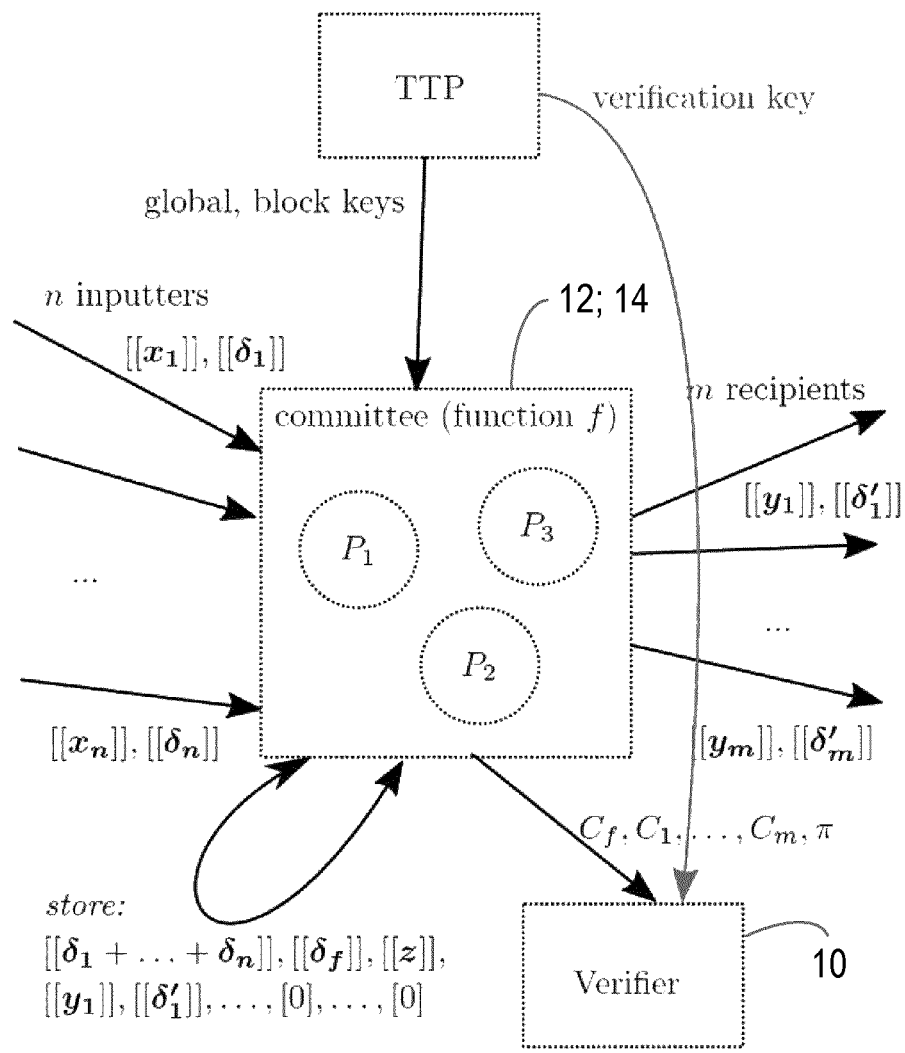
FIG. 9 is another diagram illustrating the inputs and outputs of a committee that evaluates a function.

When deploying Geppetto (e.g. as shown in FIG. 9) during the computation the committee 12, 14 gets, in addition to the secret-shared inputs $\vec{x}_1$ of each inputter, also secret-shared randomness $\vec{\delta}_i = (\delta_{i,v}, \delta_{i,w}, \delta_{i,y})$ (this corresponds to step 401 in FIG. 5). Instead of computing $(\vec{y}_1, \ldots, \vec{y}_m) = f(\vec{x}_1, \ldots, \vec{x}_n)$ (where $f$ is the part of the distributed computation assigned to the committee), the committee 12, 14 now computes $(\vec{y}_1, \ldots, \vec{y}_m, \vec{z}) = f(\vec{x}_1, \ldots, \vec{x}_n)$ such that $(\vec{x}_1, \ldots, \vec{y}_1, \ldots, \vec{z})$ is a solution to the QAP for function $f$ (this corresponds to step 407 in FIG. 5). In addition, the committee 12, 14 generates randomness $[[\vec{\delta}_f]], [[\vec{\delta}'_1]], \ldots$ to be used in the commitment to its internal wires and to the wires it shares with the various recipients 10 (this corresponds to determining the secret share of the output commitment opening in step 409 in FIG. 5). The workers 8 in the committee 12, 14 provide $\vec{y}_i$ and $\vec{\delta}_i'$ to recipient m—in secret shared form if the recipient 10 is another committee, or opened if it is an actual recipient 10. Finally, the committee generates 8+7 m additive sharings [0] of zero used to randomise its proof elements. They store all of these secret shares until they are requested to produce a proof. It will be noted that it suffices to store $[[\Sigma \vec{\delta}_i]]$ instead of the individual $[[\vec{\delta}_1]]$.

When requested to produce a proof, the workers 8 in the committee 12, 14 build secret shares of the commitments $C_f$ to their internal wires, and $C_1, \ldots, C_m$ to the wires they shares with the recipients 10 (this corresponds to determining a secret share of an output commitment in step 409 of FIG. 5). It should be noted that outputs for different recipients 10 can be combined into a single commitment as long as outlined above, as long as this does not conflict with wire values from other parties that the recipients 10 might receive. They use the additive zero sharings [0] to re-randomise these proof elements. Finally, they produce shares of their proof that f was computed correctly with respect to these commitments and the commitments shared with the inputters 6 (this corresponds to step 411 in FIG. 5). Concerning the commitments from the inputters 6, this proof is made based on $[[\Sigma \vec{\delta}_i]]$; and so knowing the actual commitments is not necessary. To build the proof and commitments, the workers 8 use a global key and specific keys for each commitment block provided by a trusted third party, TTP (e.g. central authority node 4). The workers 8 provide the values to the verifier 10 (this corresponds to step 413 of FIG. 5).

A verifier 10 collects from all inputters 6 commitments to their inputs (this corresponds to step 503 of FIG. 6), and from all workers 8 in the committee 12, 14 shares of their proofs (this corresponds to step 509 of FIG. 6) and commitments (this corresponds to step 505 of FIG. 6). Recombining these shares, the verifier 10 now verifies that the computation was correctly carried out with respect to the committed inputs and outputs (this corresponds to step 513 of FIG. 6). Verification is with respect to a verification key provided by the trusted third party (TTP) (this corresponds to step 511 of FIG. 6). Any inputter or outputter, who (as only party) knows the randomness of its commitment, can verify the correctness of the commitments used (this corresponds to step 507 of FIG. 6), or prove knowledge and/or properties of the underlying values to others.

Implementations Based on Commit-and-Prove

Various alternative embodiments may be based on "commit-and-prove" schemes. A commit-and-prove scheme can be as described in "Prover-efficient commit-and-prove zero-knowledge snarks" by Helger Lipmaa, in Cryptology ePrint Archive, Report 2014/396, 2014. At a conceptual level, these embodiments would at least involve the following differences with the Trinocchio-based embodiments above:

All commitment generation and verification keys would be the same, e.g., they would correspond to commitments using the "Interpolating Commitment Scheme" from Definition 1 of "Prover-efficient commit-and-prove zero-knowledge snarks";

The computation part prove keys (e.g., the prover parts $crs_p$ of the common reference strings for the various SNARKs presented in "Prover-efficient commit-and-prove zero-knowledge snarks") and verification keys (e.g., the verifier parts $crs_v$ of the common reference strings for the various SNARKs presented in "Prover-efficient commit-and-prove zero-knowledge snarks") no longer need to be generated at the same time as the commitment keys, and in particular, different computations can use the same set of commitment keys and new computations can be performed on already committed data (i.e. inputs);

In some commit-and-prove schemes, the computation part prove keys no longer need to be generated by the central authority 4.

An implementation of a commit-and-prove scheme can be based on the technique described in the patent entitled "PINOCCHIO/TRINOCCHIO ON AUTHENTICATED DATA" having application No. 62/608,650, filed on Dec. 21, 2017 in the name of KONINKLIJKE PHILIPS, N.V., the content of which is hereby incorporated by reference. In that technique, Pinocchio is turned into a commit-and-proof scheme with computation-independent commitments by representing external committed data (i.e. inputs or outputs) for a computation as:

$$\langle I \rangle_1 = x_0 \cdot \langle 1 \rangle_1 + \sum_{i=l+1}^{m} x_i \cdot \langle s^i \rangle_1, \langle \gamma I \rangle_1 = x_0 \cdot \langle \gamma \rangle_1 + \sum_{i=l+1}^{m} x_i \cdot \langle \gamma \cdot s^i \rangle_1$$

where s is a trapdoor value, $x_0$ is a random value, $\gamma$ is a random value in a ring $\mathbb{F}$, $x_i$ is the value of the ith wire in the computation, the range l+1 to m represents the set of wires that represent the external data, and $\langle x \rangle_1$ for value x is an additively homomorphic encoding of x. For the purposes of the present disclosure, s and $\langle x \rangle_1$ may be as defined above, i.e. s is the secret value above; the ring $\mathbb{F}$ is a field; and for field element x, $\langle x \rangle_1$ denotes $x \cdot g_1$ for generator $g_1$ of a discrete logarithm group (written additively).

The point is that, if the ith value contained in the input or output (seen as a vector, and where i is in the range l+1 to m defined above) is to correspond to the jth wire of a computation, then the $\langle r_v \beta_S v_j + r_w \beta_S w_j + r_y \beta_S y_j \rangle_1$ contribution in the internal wire commitment to the computation's wire is turned into $\langle r_v \beta_S v_j + r_w \beta_S w_j + r_y \beta_S y_j + s^i \rangle_1$; where $\beta_S$, $r_v$ and $r_w$ are random values and $r_y = (r_v \cdot r_w)$ for each trusted input value, $v_i$, $w_i$ and $y_i$ are polynomials evaluated at s that represent the computation, with $v_k$ representing the way that the respective internal wire is used in the left factor, $w_k$ representing the way that the respective internal wire is used in the right factor, and $y_k$ representing the way that the respective internal wire is used in the product of the set of multiplications that make up the computation.

When verifying equation (1) above in section 1.2, instead of taking $\langle V \rangle_1 + \langle Y \rangle_1$, one takes $\langle V \rangle_1 + \langle Y \rangle_1 + \langle I \rangle_1$.

As discussed in "PINOCCHIO/TRINOCCHIO ON AUTHENTICATED DATA", the above technique can be generalised to multiple shared inputs or outputs. As discussed above, the wires for the first shared input or output are included in the commitment to the internal wires that do not correspond to an input or output. For each additional input or output, a separate commitment $$\langle V_i \rangle_1, \langle \alpha_v V_i \rangle_1, \langle W_i \rangle_2, \langle \alpha_w W_i \rangle_1, \langle Y_i \rangle_1, \langle \alpha_y Y_i \rangle_1, \langle Z_i \rangle_1$$

is included analogously to the commitment to the internal wires that do not correspond to an input or output or to the first input or output, but representing just the internal wires corresponding to that particular input or output, with a fresh value for $\beta$. The recipient node 10 repeats the checks in equation (1) for each of these commitments, and the check in equation (2) is adjusted so that values $\langle V \rangle_1$, $\langle W \rangle_2$, $\langle Y \rangle_1$ include the commitments.

In this case, elements $\langle 1 \rangle_1$, $\langle s^i \rangle_1$, $\langle \gamma \rangle_1$, $\langle \gamma \cdot s^i \rangle_1$ used to construct input-independent commitments form the input commitment generation keys used in steps 101, 201 and 203 and output commitment generation keys used in steps 101, 403 and 409. The description above of input-independent commitments would be used to construct the input commitments used in steps 203, 205, 503 and 513 and the output commitments in steps 409, 505 and 513. The information that needs to be shared between the workers in the committee and the parties they exchange values with in steps 207, 401, 409 and 501 are the secret-shared values and the randomness $\delta_i$, $\delta_i'$ used in the commitments, i.e. the values $x_i$ and randomness $x_0$ in the description of the computation-independent commitments $\langle I \rangle_1$, $\langle \gamma I \rangle_1$ above.

The methods and systems described herein may be useful in many settings. For example, by allowing the distribution of computations between multiple committees of servers (workers 8), the techniques described herein increase performance and hence make application of the techniques to these applications more practical:

A wearable biosensor measures data of a customer and thereby acts as trusted source; an insurance company wants to have statistics on this data to evaluate a premium for the customer. The biosensor cannot compute the data on its own so the data needs to be outsourced, but the insurer wants to be convinced of the correctness. Here, a party providing the systems herein can be the central authority and producer of the biosensor; the processing of the data can then be outsourced to multiple external workers without needing to share data with them, while correctness is still guaranteed.

Governments periodically publish health statistics to inform the public. These statistics can be authenticated with respect to the data by the hospitals and other medical organizations so that the public is sure they are correct. In this case, the party providing the systems disclosed herein could act as trusted party independent from both the trusted sources (medical organizations) and worker (different parties instructed by the government to compute the statistics in a distributed, privacy-preserving fashion).

A smart meter produces readings but does not have the computational power to compute an aggregate report on this, or the aggregate report format may change over time. Hence this is outsourced to the owner of the smart meter. But the energy company wants to be sure that the aggregate report has not been manipulated by the owner to reduce her electricity bill. Here, the bill can be computed by multiple external cloud parties without needing to share the readings with those workers and without having to rely on them for correctness.

Similarly, the scheme can be used for pay-as-you-drive insurance.

A bookkeeper authenticates financial data of an organization; based on proofs an auditor can check that certain processes were followed correctly.

The system could be deployed for consumers to get loyalty discounts based on payment information provided by sales terminals, without the shop knowing details about the consumer's purchases (assuming the shop cannot see what happens inside the sales terminals).

Another potential use case is that of privacy-preserving medical research. Here, researchers from multiple institutions can perform research on joint datasets while only seeing aggregate data. Using privacy-preserving verifiable computation, a researcher can build a proof that certain claimed results (e.g., a statistically significant correlation between a treatment and a medical outcome) are true, without seeing the data himself or needing to share it with peer reviewers. As above, the techniques described herein increase practicality by allowing these proofs to be constructed in a distributed way.

There is therefore provided a system, methods and nodes that achieve verifiable, privacy-preserving and distributed computations.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first node for use in a system, the first node comprising:
a memory comprising non-transitory machine-readable medium; and
a processor;
wherein the first node is configured to:
determine a plurality of keys for enabling a computation by a plurality of worker nodes in the system, wherein the computation comprises a plurality of computation parts, each computation part being computed in a privacy-preserving manner by a respective committee of worker nodes of the plurality of worker nodes such that there are a plurality of committees of worker nodes, at least one worker node being part of a committee for a first computation part but not of a committee for a second computation part, wherein the plurality of computation parts comprises one or more types of computation part, and wherein an output from one computation part to another computation part is a shared block; and
publish the determined plurality of keys for access by at least one input node in the system, the plurality of worker nodes, and at least one recipient node in the system;
wherein the plurality of keys comprises:
a computation part prove key for each part of the computation for use by a worker node of the committee computing a respective computation part in proving that the worker node performed the respective computation part correctly;
a computation part verification key for each part of the computation for use by a recipient node of the at least one recipient node to verify that the worker nodes in each committee performed the respective computation part correctly with respect to one or more input commitments, one or more shared block commitments, and output commitments or output commitment openings;
a shared block commitment generation key for each shared block for use by the worker node of the plurality of worker nodes in determining the shared block commitment or a secret share of the shared block commitment for the shared block;
an input commitment generation key for each input node and computation part combination for use by the input node in determining the input commitment for an input to the respective computation part; and
an output commitment generation key for each recipient node and computation part combination for use by the worker node of the committee computing the computation part in determining the output commitment or a secret share of the output commitment for a result of the computation part;
wherein the at least one recipient node is configured to receive the output commitment or the secret share of the output commitment for the result of the computation part from at least one respective worker node of each of the plurality of committees of worker nodes.

2. A first node as claimed in claim 1, wherein the computation part verification key is the same for each type of computation part.

3. A first node as claimed in claim 1, wherein the at least one recipient node is to provide one or more parameter values for the computation, and wherein the computation part verification key is different for each type of computation part.

4. A first node as claimed in claim 1, wherein the first node is further configured to:
determine one or more of a shared block commitment verification key for each shared block, an input commitment verification key for each input commitment generation key and an output commitment verification key for each output commitment generation key.

5. A method of operating a first node in a system, wherein the method comprises:
determining a plurality of keys for enabling a computation by a plurality of worker nodes in the system, wherein the computation comprises a plurality of computation parts, each computation part being computed in a privacy-preserving manner by a respective committee of worker nodes of the plurality of worker nodes such that there are a plurality of committees of worker nodes, at least one worker node being part of a committee for a first computation part but not of a committee for a second computation part, wherein the plurality of computation parts comprises one or more types of computation part, and wherein an output from one computation part to another computation part is a shared block; and
publishing the determined plurality of keys for access by at least one input node in the system, the plurality of worker nodes, and at least one recipient node in the system;
wherein the plurality of keys comprises:
a computation part prove key for each part of the computation for use by a worker node of the committee computing a respective computation part in proving that the worker node performed the respective computation part correctly;
a computation part verification key for each part of the computation for use by a recipient node of the at least one recipient node to verify that the worker nodes in each committee performed the respective computation part correctly with respect to one or more input commitments, one or more shared block commitments, and output commitments or output commitment openings;
a shared block commitment generation key for each shared block for use by a worker node of the plurality of worker nodes in determining the shared block commitment or a secret share of the shared block commitment for the shared block;
an input commitment generation key for each input node and computation part combination for use by the input node in determining the input commitment for an input to the respective computation part; and
an output commitment generation key for each recipient node and computation part combination for use by the worker node of the committee computing the computation part in determining the output commitment or a secret share of the output commitment for a result of the computation part;
wherein the at least one recipient node is configured to receive the output commitment or the secret share of the output commitment for the result of the computation part from at least one respective worker node of each of the plurality of committees of worker nodes.

6. The first node as claimed in claim 1, further comprising wherein the input node has one or more inputs for the computation and the computation comprises a plurality of parts, and wherein the input node is configured to:
obtain the one or more input commitment generation keys for the input node, wherein an input commitment scheme used to generate the input commitment generation keys supports reuse of the input commitments in multiple computation parts, the one or more input commitment generation keys being published by the first node according to claim 1;
determine, using the obtained one or more input commitment generation keys, the input commitment and an input commitment opening for each of the one or more inputs;
output the one or more determined input commitments; and
send, to each worker node in the system that is to perform the computation part on the input, a respective secret share of the determined input commitment opening for the input.

7. The first node as claimed in claim 6, further comprising wherein the input node is further configured to:
send, to each worker node in the system that is to perform the first computation part on the input, the respective secret share of the determined input commitment opening for the input;
and send, to each worker node in the system that is to perform the second computation part on the input, the respective secret share of the determined input commitment opening for the input.

8. The method of claim 5, wherein the method further comprises operating the input node in a system, wherein the input node has one or more inputs for the computation and the computation comprises a plurality of parts, wherein the operation comprises:
obtaining the one or more input commitment generation keys for the input node, wherein an input commitment scheme used to generate the input commitment generation keys supports reuse of the input commitments in multiple computation parts, the one or more input commitment generation keys being published according to the method of claim 5;
determining, using the obtained one or more input commitment generation keys, the input commitment and an input commitment opening for each of the one or more inputs;
outputting the one or more determined input commitments; and
sending, to each worker node in the system that is to perform the computation part on the input, a respective secret share of the determined input commitment opening for the input.

9. The first node as claimed in claim 1, further comprising wherein the worker node is configured to:
receive, from one or more other nodes in the system, a respective secret share of one or more input commitment openings for the one or more inputs to the computation part of the computation to be performed by the worker node;

obtain the one or more output commitment generation keys;

obtain the computation part prove key for the computation part to be performed by the worker node;

wherein a computation part proving scheme used to generate the computation part prove key supports reuse of commitments in multiple computation part proofs of different types of computation, the computation part proof key and the one or more output commitment generation keys being published by the first node according to claim 1;

compute the result of the computation part using the received respective secret share of the one or more input commitment openings, wherein the result of the computation part is computed as the privacy-preserving computation by the worker node and the one or more other worker nodes, wherein the worker node and the one or more other worker nodes form a first committee of worker nodes;

determine, using the obtained one or more output commitment generation keys, the output commitment or the secret share of the output commitment and the secret share of the output commitment opening for the result of the computation part;

generate, using the computation part prove key, a computation part proof or a secret share of the computation part proof for use in proving that the worker node performed the computation part correctly with respect to the one or more input commitment openings and the determined output commitment openings; and output the computation part proof or the secret share of the computation part proof.

10. The first node as claimed in claim 9, further comprising wherein the worker node is configured to generate the secret share of the computation part proof and cooperate with the one or more other worker nodes in the first committee of worker nodes to determine the computation part proof, and wherein the worker node is configured to output the determined computation part proof.

11. The first node as claimed in claim 9, further comprising wherein one or both of (i) the one or more other nodes, other than the worker node, in the system that the respective secret share of the one or more input commitment openings is received from, and (ii) the one or more other nodes in the system that the secret share of the output commitment opening is sent to, is a second committee of worker nodes comprising a plurality of worker nodes that perform a different computation part of the computation.

12. The first node as claimed in claim 9, further comprising wherein the worker node is further configured to:

obtain one or more input commitments for the one or more inputs;

perform a check with the one or more other worker nodes in the first committee that the secret shares of the one or more input commitment openings correspond to the one or more input commitments; and compute the result of the computation part if the obtained secret shares of the one or more input commitment openings correspond to the one or more input commitments.

13. The method of claim 5, wherein the method further comprises operating a worker node in a system, wherein the operation comprises:

receiving, from one or more other nodes in the system, a respective secret share of one or more input commitment openings for the one or more inputs to the computation part of the computation to be performed by the worker node;

obtaining the one or more output commitment generation keys;

obtaining the computation part prove key for the computation part to be performed by the worker node;

wherein a computation part proving scheme used to generate the computation part prove key supports reuse of commitments in multiple computation part proofs of different types of computation, the computation part proof key and the one or more output commitment generation keys being published according to the method of claim 5;

computing the result of the computation part using the received respective secret share of the one or more input commitment openings, wherein the result of the computation part is computed as the privacy-preserving computation by the worker node and the one or more other worker nodes, wherein the worker node and the one or more other worker nodes form a first committee of worker nodes;

determining, using the obtained one or more output commitment generation keys, the output commitment or the secret share of the output commitment and the secret share of the output commitment opening for the result of the computation part;

generating, using the computation part prove key, a computation part proof or a secret share of the computation part proof for use in proving that the worker node performed the computation part correctly with respect to the one or more input commitment openings and the determined output commitment openings; and outputting the computation part proof or the secret share of the computation part proof.

14. The first node as claimed in claim 9, further comprising wherein the recipient node is configured to:

receive, from the one or more worker nodes in the system, the secret shares of the one or more output commitment openings for the outputs of the one or more computation parts of the computation performed by the one or more worker nodes, wherein the output from one computation part to another computation part is the shared block;

obtain one or more published input commitments for the one or more inputs to the computation provided by the one or more input nodes in the system;

obtain the one or more shared block commitments for the one or more shared blocks provided from a first committee of worker nodes to a second committee of worker nodes;

form an output of the computation from the received secret shares of the one or more output commitment openings;

obtain a computation part proof or secret shares of the computation part proof for each part of the computation;

obtain the computation part verification key for each part of the computation, the computation part verification key being published by the first node according to claim 1; and use the computation part proof or secret shares of the computation part proof for each part of the computation and the one or more computation part verification keys to verify that the worker nodes in each committee performed the respective computation part correctly with respect to the one or more input commitments, the one or more shared block commitments and the output commitment openings or the output commitments.

15. The method of claim 5, wherein the method further comprises operating a recipient node in a system, wherein the operation comprises:
- receiving, from the one or more worker nodes in the system, the secret shares of the one or more output commitment openings for the outputs of the one or more computation parts of the computation performed by the one or more worker nodes, wherein the output from one computation part to another computation part is the shared block;
- obtaining one or more published input commitments for the one or more inputs to the computation provided by the one or more input nodes in the system;
- obtaining the one or more shared block commitments for the one or more shared blocks provided from a first committee of worker nodes to a second committee of worker nodes;
- forming an output of the computation from the received secret shares of the one or more output commitment openings;
- obtaining a computation part proof or secret shares of the computation part proof for each part of the computation;
- obtaining the computation part verification key for each part of the computation, the computation part verification key being published according to the method of claim 5; and
- using the computation part proof or secret shares of the computation part proof for each part of the computation and the one or more computation part verification keys to verify that the worker nodes in each committee performed the respective computation part correctly with respect to the one or more input commitments, the one or more shared block commitments and the output commitment openings or the output commitments.

16. A computer program product comprising a non-transitory computer-readable storage medium having computer readable code embodied therein, the computer readable code being configured such that, on execution by a suitable computer or processor, the computer or processor is caused to perform the method of claim 5.

* * * * *